(12) United States Patent
Li et al.

(10) Patent No.: US 7,565,278 B2
(45) Date of Patent: Jul. 21, 2009

(54) METHOD, SYSTEM AND APPARATUS FOR SIMULATING FLUID FLOW IN A FRACTURED RESERVOIR UTILIZING A COMBINATION OF DISCRETE FRACTURE NETWORKS AND HOMOGENIZATION OF SMALL FRACTURES

(75) Inventors: Liyong Li, Livermore, CA (US); Seong H. Lee, Emeryville, CA (US); Clair Jensen, Oakland, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 101 days.

(21) Appl. No.: 11/566,609

(22) Filed: Dec. 4, 2006

(65) Prior Publication Data

US 2008/0133186 A1  Jun. 5, 2008

(51) Int. Cl.
*G06F 7/60* (2006.01)
*G06F 17/10* (2006.01)
*G06G 7/58* (2006.01)
(52) U.S. Cl. ............................................. 703/10; 703/2
(58) Field of Classification Search ..................... 703/2, 703/10
See application file for complete search history.

(56) References Cited

U.S. PATENT DOCUMENTS

| | | | |
|---|---|---|---|
| 4,442,710 | A | 4/1984 | Meng |
| 4,907,442 | A | 3/1990 | Jones et al. |
| 5,058,012 | A | 10/1991 | Hinchman et al. |
| 5,661,698 | A | 8/1997 | Cacas |
| 5,996,726 | A | 12/1999 | Sorrells et al. |
| 6,018,497 | A | 1/2000 | Gunasekera |
| 6,023,656 | A | 2/2000 | Cacas et al. |

(Continued)

FOREIGN PATENT DOCUMENTS

GB 2322702 9/1998

(Continued)

OTHER PUBLICATIONS

S.H. Lee, C.L. Jensen, M.F. Lough, "An Efficient Finite Difference Model For Flow In a Reservoir With Multiple Length-Scale Fractures", Society of Petrolium Engineers, SPE 56752, Oct. 3-6, 1999, pp. 1-11.*

(Continued)

*Primary Examiner*—Paul L Rodriguez
*Assistant Examiner*—Dwin M Craig
(74) *Attorney, Agent, or Firm*—Christopher D. Northcutt

(57) ABSTRACT

A three-dimensional hybrid reservoir model representative of a fractured subterranean reservoir is created for simulating fluid flow. The model includes porous matrix blocks and a network of long fractures, which include two-dimensional fracture blocks, that ideally overly and are fluidly connected to the matrix blocks. To simulate fluid flow, matrix and fracture flow equations are obtained and effective fluid flow transmissibilities are determined. The matrix and fracture flow equations are then coupled via the effective fluid flow transmissibilities, such that they can be solved simultaneously for flow responses. The long fractures can be in direct fluid communication with one or more intersecting wells or other fractures. These intersections can be modeled as a point source to enhance numerical stability during simulation. The fracture characteristics, such as orientation, fracture aperture, fracture length, and fracture height, are more realistically modeled using this approach compared to previously known reservoir models.

19 Claims, 10 Drawing Sheets

U.S. PATENT DOCUMENTS

| | | | |
|---|---|---|---|
| 6,052,520 A | 4/2000 | Watts, III | |
| 6,064,944 A | 5/2000 | Sarda et al. | |
| 6,078,869 A | 6/2000 | Gunasekera | |
| 6,094,619 A | 7/2000 | Noetinger et al. | |
| 6,370,491 B1 | 4/2002 | Malthe-Sorenssen et al. | |
| 0,247,011 A1 | 6/2002 | Ortoleva | |
| 6,668,922 B2 | 12/2003 | Ziauddin et al. | |
| 6,766,255 B2 | 7/2004 | Stone | |
| 6,795,773 B2 | 9/2004 | Soliman et al. | |
| 6,810,370 B1 * | 10/2004 | Watts, III | 703/10 |
| 6,842,725 B1 | 1/2005 | Sarda | |
| 6,922,662 B2 | 7/2005 | Manceau et al. | |
| 6,941,255 B2 | 9/2005 | Kennon et al. | |
| 7,006,951 B2 | 2/2006 | Pond, Jr. et al. | |
| 7,031,891 B2 | 4/2006 | Malthe-Sorenssen et al. | |
| 7,043,410 B2 | 5/2006 | Malthe-Sorenssen et al. | |
| 7,047,165 B2 | 5/2006 | Balaven et al. | |
| 7,089,166 B2 | 8/2006 | Malthe-Sorenssen et al. | |
| 7,149,671 B2 | 12/2006 | Lim et al. | |
| 2002/0010570 A1 | 1/2002 | Malthe-Sorenssen et al. | |
| 2002/0013687 A1 | 1/2002 | Ortoleva | |
| 2002/0016702 A1 | 2/2002 | Manceau et al. | |
| 2002/0029137 A1 | 3/2002 | Malthe-Sorenssen et al. | |
| 2002/0091502 A1 | 7/2002 | Malthe-Sorenssen et al. | |
| 2003/0216898 A1 | 11/2003 | Basquet et al. | |
| 2005/0027499 A1 | 2/2005 | Bourbiaux et al. | |
| 2005/0273303 A1 | 12/2005 | Flandrin et al. | |
| 2006/0015310 A1 | 1/2006 | Husen et al. | |
| 2006/0235667 A1 | 10/2006 | Fung et al. | |
| 2007/0016389 A1 | 1/2007 | Ozgen | |
| 2007/0073527 A1 | 3/2007 | Flandrin et al. | |

FOREIGN PATENT DOCUMENTS

| | | |
|---|---|---|
| GB | 2322948 | 9/1998 |
| GB | 2322949 | 9/1998 |
| GB | 2379685 | 3/2003 |
| GB | 2404473 | 2/2005 |
| WO | WO03023188 | 3/2003 |

OTHER PUBLICATIONS

S. Sarda, L. Jeannin, B. Bourbiaux, "Hydraulic Characterization of Fractured Reservoirs: Simulation on Discrete Fracture Models", Society of Petroleum Engineers, SPE 66398, Feb. 11-14, 2001, pp. 1-12.*

Karimi-Fard, M. et al., "An Efficient Discrete-Fracture Model Applicable for General-Purpose Reservoir Simulators", Society of Petroleum Engineers, SPE 88812, pp. 227-236, Jun. 2004.

Lee, S.H. et al., "Hierarchical Modeling of Flow in Naturally Fractured Formations with Multiple Length Scales", Water Resources Research, pp. 37, 443-455, 2001.

M. F. Lough, et al., An Efficient Boundary Integral Formulation for Flow Through Fractured Porous Media, Journal of Computational Physics, Jul. 1, 1998, Article No. CP985858, pp. 462-483, vol. 143, Issue 2, Elsevier, Inc., Atlanta, Georgia.

* cited by examiner

METHOD, SYSTEM AND APPARATUS FOR SIMULATING FLUID FLOW IN A FRACTURED RESERVOIR UTILIZING A COMBINATION OF DISCRETE FRACTURE NETWORKS AND HOMOGENIZATION OF SMALL FRACTURES

FIELD OF INVENTION

The present invention relates generally to methods, systems and apparatus for simulating fluid flow in subterranean reservoirs, and more particularly, to the simulation of fluid flow in naturally fractured reservoirs.

BACKGROUND OF THE INVENTION

Many reservoirs are highly fractured due to the complex tectonic movement and sedimentation process the formation has experienced. The permeability of a fracture is usually much larger than that of the surrounding rock matrix. As a result, the fluid will flow mostly through the fracture network, if the fractures are connected. This implies that the fracture connectivities and their distribution will largely determine fluid transport in a naturally fractured reservoir. Due to statistically complex distribution of geological heterogeneity and multiple length and time scales in natural porous media, three approaches are commonly used in describing fluid flow and solute transport in naturally fractured formations: (1) discrete fracture models, (2) continuum models using effective properties for discrete grids, and (3) hybrid models that combine discrete large features and equivalent continuum.

Currently, most reservoir simulators employ dual continuum formulations (i.e., dual porosity/permeability) for naturally fractured reservoirs, in which reservoir models comprising a grid of porous matrix blocks are divided by very regular fracture patterns. A primary input into these simulation models is the permeability of the fracture system assigned to the individual matrix blocks. The permeability can only be reasonably calculated if the fracture systems are regular and well connected. However, field characterization studies have shown that fracture systems are very irregular, often disconnected and occur in swarms. This dual porosity/permeability method is well known to be computationally inefficient and is inflexible with respect to capturing or honoring fracture characteristics in real reservoirs.

Most naturally fractured reservoirs include fractures of multiple length-scales. The effective matrix block permeability calculated by a conventional boundary element method becomes prohibitively expensive as the number of fractures increases. The calculated effective properties for matrix blocks also underestimates the properties for long fractures whose length scale is much larger than the dimensions of a matrix block.

S. H. Lee, M. F. Lough and C. L. Jensen, *Hierarchical modeling of flow in naturally fractured formations: with multiple length scales*, Water Resources Research, 37, 443-455, 2001, (hereafter referred to as Lee et al.) proposed a hierarchical method to model fluid flow in a reservoir with multiple-length scaled fractures. This Lee et al. reference is hereby incorporated by reference in its entirety. Lee et al. assumed that short fractures are randomly distributed and contribute to increasing the effective matrix permeability. An asymptotic solution representing the permeability contribution from short fractures was derived. With the short fracture contribution to permeability, the effective matrix permeability can be expressed in a general tensor form. Furthermore, Lee et al. also developed a boundary element method for Darcy's equation with tensor permeability. For medium-length fractures in a matrix block, a coupled system of Poisson equations with tensor permeability was solved numerically using a boundary element method. The matrix block effective permeabilities were used with a finite difference simulator to compute flow through the fracture system. The simulator was enhanced to use a control-volume finite difference formulation for general tensor permeability input (i.e., 9-point stencil for 2-D and 27-point stencil for 3-D). In addition, long fractures were explicitly modeled by using a transport index between a fracture and the porous matrix in a grid block.

Lee et al. modeled long fractures explicitly. In their work, the fracture length of the long fractures is much longer than the matrix block size but the fracture height is short (equivalent to the matrix block size). They applied the concept of well bore productivity index (PI) to derive a transport index to describe the fluid transport between fractures and matrix blocks, and then formulated fluid flow as a one-dimensional well-like equation inside the fracture and a source/sink term between the fracture and matrix blocks. Although using wellbore PI concept is a novel way to model long fractures explicitly and efficiently, their implementation has several limitations: (1) fractures are one-dimensional, (2) fractures are not connected, and (3) fractures do not intersect well bores. Furthermore, this method also fails to adequately honor fracture characteristics found in actual fractured reservoirs.

The present invention overcomes the shortcomings in the previous work of Lee et al. and others with regard to realistically modeling fluid flow in fractured reservoirs.

SUMMARY OF THE INVENTION

The present invention includes a method, apparatus and system for simulating fluid flow in a fractured subterranean reservoir. A three-dimensional hybrid reservoir model representative of a fractured subterranean reservoir is created. The model includes porous matrix blocks and a network of long fractures overlying the matrix blocks. Although not required, small and medium fractures are preferably modeled by effective permeabilities, which are incorporated with the permeability of porous matrix blocks, and networks of large fractures which are modeled by two-dimensional long fractures. The networks of long fractures include two-dimensional fracture blocks. Matrix and fracture flow equations for fluid flow in the matrix blocks and fracture blocks are obtained. The effective fluid flow transmissibilities between the matrix blocks and the fracture blocks are determined. The matrix and fracture flow equations are coupled via the effective fluid flow transmissibilities. For example, see equations (13) and (17) below. The matrix and fracture flow equations are then solved simultaneously for flow responses. These flow responses may include pressures, saturations, temperatures, flow rates, etc. for fluids in the reservoir being modeled.

Two-dimensional fracture blocks are used which ideally overly and are fluidly connected to underlying matrix blocks. The long fractures may be in direct in fluid communication with one or more intersecting wells. Where long fractures intersect with one another, the intersection of the long fractures may be modeled as a point source to enhance numerical stability during simulation. The hybrid reservoir model may utilize networks of fractures in conjunction with an underlying grid of matrix blocks wherein fracture characteristics such as (1) orientation; (2) fracture aperture; (3) fracture length; and (4) fracture height are more realistically modeled than in previously known reservoir models.

Preferably, the fracture blocks are disposed in the matrix blocks and are at least partially defined by the intersection of the long fractures and the boundaries of the matrix blocks. The hybrid reservoir model may include at least one well for the injection into, or production from, the fractured reservoir. At least one fracture block may intersect with the well and fluid may flow directly between the well and the at least one intersecting fracture block. The pressure in the well and in an intersecting fracture block may be maintained at the same pressure whereby numerical stability in solving the flow equations is enhanced.

The matrix blocks can be arranged in multiple layers of matrix blocks. At least one of the long fractures may extend across the multiple layers and have direct fluid communication through its fracture blocks and across the multiple layers. At least one of the fracture blocks may be less than the height of the matrix block in which it is disposed to model a partial thickness fracture.

The two-dimensional fracture blocks are ideally defined by two opposing plates with an aperture defined there between. The two-dimensional long fractures preferably have lengths and heights which are representative of the fractures in the fractured reservoir being modeled to honor the physical orientation of estimated fractures in the fractured reservoir being modeled. A transport index may be used to fluidly couple the matrix blocks to the respective fracture blocks in which the fracture blocks are disposed. Where at least two of the long fractures intersect with one another to form an intersection, the intersection may be modeled as a source or sink term to enhance the stability of the solving of the flow equations. The reservoir model ideally includes means for direct matrix block to fracture block fluid communication, direct matrix block to well fluid communication and direct fracture block to well block communication.

A program storage device is provided which is readable by a machine, tangibly embodying a program of instructions executable by the machine to perform method steps for simulating fluid flow in a fractured subterranean reservoir, the method comprising the steps of:

(a) creating a three-dimensional hybrid reservoir model representative of a fractured subterranean reservoir, the hybrid reservoir model including porous matrix blocks and a network of long fractures overlying the matrix blocks, the network of long fractures including two-dimensional fracture blocks;

(b) obtaining matrix and fracture flow equations for fluid flow in the matrix and fracture blocks;

(c) determining the effective fluid flow transmissibility between the matrix blocks and the fracture blocks;

(d) coupling the matrix and fracture flow equations via the effective fluid flow transmissibility; and (e) solving simultaneously the matrix and fracture flow equations for flow responses.

Also, the invention may include a simulation apparatus for simulating fluid flow in a fractured subterranean reservoir. The apparatus comprises:

(a) means for creating a three-dimensional hybrid reservoir model representative of a fractured subterranean reservoir, the hybrid reservoir model including porous matrix blocks and a network of long fractures overlying the matrix blocks, the network of long fractures including two-dimensional fracture blocks;

(b) means for obtaining matrix and fracture flow equations for fluid flow in the matrix and fracture blocks;

(c) means for determining the effective fluid flow transmissibility between the matrix blocks and the fracture blocks;

(d) means for coupling the matrix and fracture flow equations via the effective fluid flow transmissibility; and (e) solving simultaneously the matrix and fracture flow equations for flow responses.

The apparatus and system can ideally carry out the other steps associated with the aforementioned method steps for carrying out reservoir simulation of fractured reservoirs.

It is an object of the present invention to simulate fluid flow in a fractured subterranean reservoir using networks of long fractures comprised of two-dimensional fracture blocks which overly and are fluidly connected to underlying matrix blocks.

It is another object to model fractures using networks of long fractures wherein the long fractures are directly in fluid communication with one or more intersecting wells.

A further object is to model fractures using networks of long fractures wherein the long fractures intersect with one another, the intersection of the long fractures being modeled as a point source to enhance numerical stability during simulation.

Yet another object is to provide a hybrid reservoir model utilizing networks of fractures in conjunction with an underlying grid of matrix blocks wherein fracture characteristics such as (1) orientation; (2) fracture aperture; (3) fracture length; and (4) fracture height are more realistically modeled than in previously known reservoir models.

BRIEF DESCRIPTION OF THE DRAWINGS

These and other objects, features and advantages of the present invention will become better understood with regard to the following description, pending claims and accompanying drawings where:

DETAILED DESCRIPTION OF THE INVENTION

I. Introduction

Figure 1:
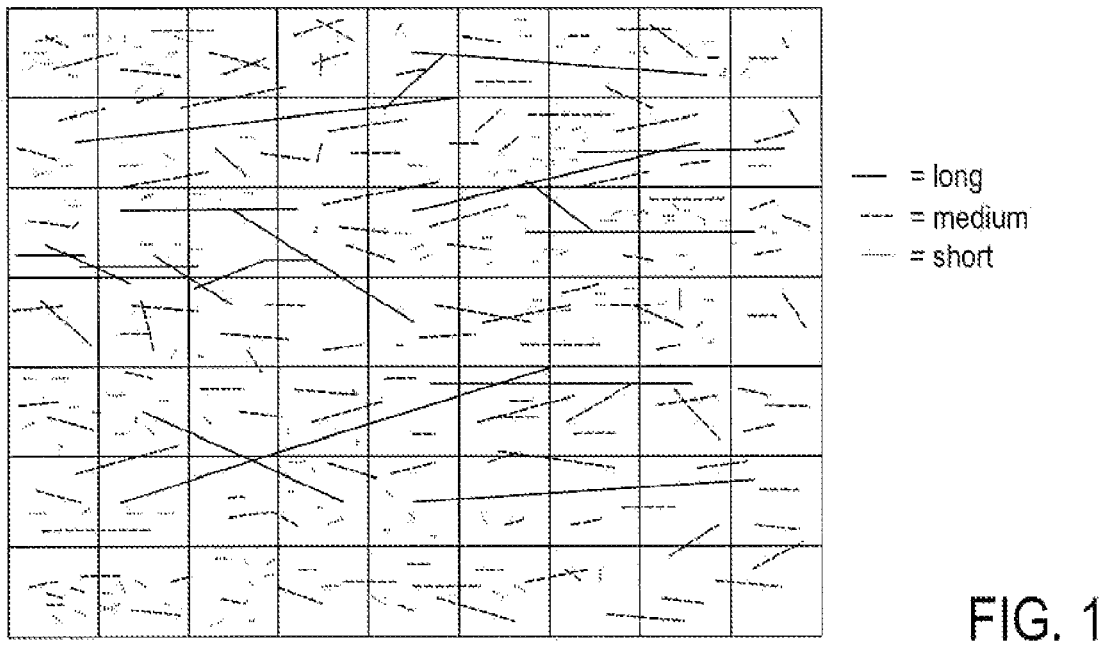
FIG. 1 is a top view of a three-dimensional model of a fractured subterranean reservoir showing a distribution of short, medium and long fractures.

In a preferred and exemplary embodiment of the present invention, a simulation method utilizing a hybrid reservoir model is described which is used to simulate multi-phase flow in a field-scale naturally fractured reservoir. This method may be used for artificially fractured reservoirs as well. However, due to the limited length of fractures in such artificially fractured reservoirs, the computational advantages offered by the present invention are not nearly as great as in very large scale naturally fractured reservoirs.

In this exemplary embodiment, small and medium fractures are modeled by effective permeability, which is incorporated with the permeability of porous matrix blocks, and networks of large fractures are modeled by two-dimensional long fractures. A network of fractures is a network which includes long fractures which intersect and connect with one another. A systematic approach is devised to calculate transport parameters between networks of long fractures and discretized, homogenized media found in porous matrix blocks. An efficient numerical algorithm is also devised to solve the dual system of the networks of long fractures and preferably a finite volume grid of matrix blocks. For demonstration purposes, a black oil formulation is implemented in a simulator to show practical applications of this simulation method employing a hybrid reservoir model including two-dimensional fracture blocks.

II. Reservoir Simulation and Black Oil Formulation

Reservoir simulation is well known throughout the oil industry and in the scientific literature. A good primer on the principles behind reservoir simulation is K. Aziz and A. Settari, *Petroleum Reservoir Simulation*, Elsevier Applied Science Publishers, London (1979). Another description of how reservoir simulation is generally performed is described in U.S. Pat. No. 6,052,520 to Watts III et al. These references are hereby incorporated by reference in their entireties.

The following are general steps taken in a conventional reservoir simulation. First, a reservoir is selected for which the rock and fluid properties are to be modeled and simulated. The reservoir is modeled and discretized into a plurality of cells or matrix blocks. Nonlinear governing equations are constructed for each cell, generally in the form of finite difference equations, which are representative of properties of rocks and fluids in the reservoir. Examples of rock properties include porosity, capillary pressure, and relative permeability for each phase of fluid (oil, water, gas). Examples of fluid properties include oil viscosity, oil formation factor ($B_O$), and pressure, temperature, and saturation in each of the cells. These nonlinear equations can then be solved preferably by Newton iteration method for unknowns such as pressure and saturation in the cells in a timestep. The aforementioned steps are repeated over many such timesteps to simulate fluid flow over time in the reservoir.

One of the key properties needed in reservoir simulation is the permeability of a rock to flow. Absolute permeability K is a measure of a rock's ability to transmit flow and can vary greatly throughout a reservoir and surrounding formations. When fluids move through porous rock, they do not move at equal velocities. Rather, the fluids compete with one another. Relative permeability $k_r$ is the ratio of the effective permeability $k_e$, when more than one fluid is present, to the absolute permeability K. Effective permeability $k_e$ is the measured permeability of a porous medium to one fluid when another is present. The relationship between relative permeability $k_r$ and saturation S depends on the reservoir rock and may vary between formations. Also, the relative permeability $k_r$ depends on the relative proportion of the fluids present, i.e. fluid saturations.

In this particular exemplary embodiment of the present invention, fluid flow equations are formulated to simulate a black oil flow model in both porous matrix medium and long fracture systems. Those skilled in the art will appreciate that flow models, other than a black oil model, can also be used with the concepts included in the present invention. By way of example, and not limitations, fluid flow equations can be formulated for flow models such as compositional model, etc. Nomenclature of variables used in this specification can be found at the end of this specification.

The standard black oil model includes two hydrocarbon phases (oil and gas) and one aqueous phase (water) with rock and fluid compressibility, gravity effects, and capillary pressure. The thermodynamic equilibrium between the hydrocarbon phases is described by the solubility of gas in oil. The conservation equations are nonlinear due to the strong nonlinear character of the relative permeability and capillary pressure relations, high compressibility (especially of gas), large density and viscosity differences, and phase appearance and disappearance effects.

Conventional governing equations for the black oil formulation are:

$$\frac{\partial(\phi b_o S_o)}{\partial t} = \nabla \cdot [b_o \lambda_o \cdot (\nabla p_o - g\rho_o \nabla z)] - q_o \quad (1)$$

$$\frac{\partial(\phi b_w S_w)}{\partial t} = \nabla \cdot [b_w \lambda_w \cdot (\nabla p_w - g\rho_w \nabla z)] - q_w \quad (2)$$

$$\frac{\partial[\phi(b_g S_g + R_s b_o S_o)]}{\partial t} = \nabla \cdot [b_g \lambda_g \cdot (\nabla p_g - g\rho_g \nabla z)] - \quad (3)$$
$$q_g + \nabla \cdot [R_s b_o \lambda_o \cdot (\nabla p_o - g\rho_o \nabla z)] - R_s q_o$$

on the domain $\Omega$, with boundary conditions on $\partial\Omega$. Here, $b_l = 1/B_l$ and $\lambda_l = kk_{rl}/\mu_l$ for phases l=o, w, g (i.e., oil, water, and gas), and $B_l$ denotes the formation volume factor of phase l, i.e., the volume at reservoir conditions to volume at standard conditions. Similarly, $S_l$, $k_{rl}$, $\mu_l$, and $\rho_l$ denote the saturation, relative permeability, viscosity, and density of phase l, respectively. $q_l$ is the general volumetric flow rate of source/sink, depending on the fracture or matrix system of the transport equation and the presence of a well in the grid block. The tensor k describes the permeability field, which is usually represented as a complex multi-scale function of space that tends to be highly discontinuous in discrete representations. Porosity is denoted by $\phi$, $p_l$ is the phase pressure, g is gravitational acceleration, z denotes reservoir depth, and $R_s$ the solubility of gas in oil. In general, $\mu_l$, $\rho_l$, $B_l$, $R_s$ and $\phi$ are functions of pressure, whereas the relative permeabilities, $k_{rl}$, are a strong function of saturations.

Note that equations (1)-(3) apply for both matrix and fracture flow systems. Saturations are constrained by:

$$S_o + S_w S_g = 1 \quad (4)$$

and the three phase pressures $p_w$, $p_o$ and $p_g$ are related by two independent capillary pressure functions:

$$p_w - p_o = p_{ego}(S_o, S_g, S_w) \quad (5)$$

$$p_g - p_o = p_{ego}(S_o, S_g, S_w) \quad (6)$$

In this preferred and exemplary embodiment, a black oil simulator has been developed based on these equations that can efficiently model flow in a heterogeneous reservoir with explicit networks of large fractures. Those skilled in the art will appreciate that the novel concepts described herein in association with the present invention can readily be extended to simulators beyond black oil simulators such as a compositional simulator, etc.

III. Fracture Characterizations and Simulation Framework

Most porous formations become fractured at some stage in its history. This fracturing can happen in a number of ways. For example, the fractures may be caused by nearby seismic activity or through local deformation of the strata containing the porous rock. Even though fractures are the most abundant visible structural feature in the Earth's upper crust, the fracture characterization of a reservoir is very challenging because the full distribution of fractures in the reservoir condition is practically not measurable.

Fracture systems are typically very irregular, often disconnected and may occur in swarms. Geologists use soft and hard data of different volume to interpolate and/or synthesize the fracture distribution in a reservoir. Often the fracture characterization is conditioned by (1) PLT (production logging tool), (2) image log, (3) core sample observation, (4) outcrop analog study, (5) well testing, etc. For further examples, see Narr, W. and D. W. Schechter and L. B. Thompson, *Naturally fractured reservoir characterization*, Soc. of Pet. Engs., Tulsa, Okla. 2006.

Small and medium size of fractures (less than the size of a matrix block) in a given grid of matrix blocks are ideally integrated with the corresponding matrix permeability of the matrix blocks to yield an effective tensor permeability for the matrix blocks, preferably using an analytical method for small fractures and a numerical solution of boundary element method for medium fractures. This method has been previously been described in Lee et al. for handling small and medium length fractures.

Due to the difficulty of direct measurements of fracture distribution, the fractures are in general, characterized by statistical distribution functions for aperture size, length, orientation, etc. As an example, one realization of fractures is schematically shown in FIG. 1 in which fractures of multiple length scales are generated by a stochastic process with statistical means and variances in length and orientation.

If $l_g$ is the matrix block length scale and $l_f$ is the fracture length, then the relevant parameter to consider is the ratio $l_f/l_g$. Every fracture can be classified as belonging to one of three classes: (1) short fractures with $l_f/l_g \ll 1$, (2) medium (grid-block scale) fractures with $l_f/l_g \sim 1$ and (3) long fractures with $l_f/l_g \gg 1$. In FIG. 1, the short, medium, and long fractures are readily visually identified by their lengths. The long fracture networks are clearly seen to extend over several grid blocks.

By way of example, and not limitation, a typical matrix block might be 300 feet wide by 500 feet long by 50 feet in height. Short fractures might be considered those which are less than 15 feet in length, medium fractures might be identified as being between 15 and 100 feet in length, and long fractures might be classified as those which are greater than 100 feet in length. Of course, other manners of classification may readily be used to identify what should be considered as "short", "medium" and "long" fracture and are within the scope of this invention.

A common difficulty, in addition to a wide variation of fracture length scale, when modeling flow in fractured reservoirs, is that there are usually too many fractures to be explicitly included in a flow model. Therefore, it is highly desirable to not explicitly model every fracture.

The long fractures have a more dominating influence on fluid flow than those of short and medium length fractures. Furthermore, the long fractures whose length scale is much larger than the grid size should be modeled explicitly because any homogenization method, i.e., using an effective medium method, will typically underestimate the effect of these important geological features. As a result, Lee et al. proposed the aforementioned hierarchical method based on the length scale of fractures relative to grid size. In the preferred embodiment of the present invention, this hierarchical approach is used. However, the present novel approach is modified to include networks of long fractures whose connected length is much larger than the grid block size. These networks of long fractures are modeled explicitly as discrete fracture networks rather than being homogenized into an underlying porous matrix block.

Long fractures are preferably modeled as a two-dimensional plane that can penetrate several layers of matrix blocks. The present invention also preferably allows a general description of fracture orientation in space. However, for simplicity of computational implementation, both the medium-length and long fractures considered in this exemplary embodiment are assumed to be perpendicular to bedding boundaries. Of course, the two-dimensional fractures could also be oriented at an acute angle to the bedding boundaries. In addition, a source/sink term is used to model the flux between matrix blocks and long fracture networks. This source/sink term allows for coupling multiphase flow equations in long fractures and the matrix blocks.

Figure 2:
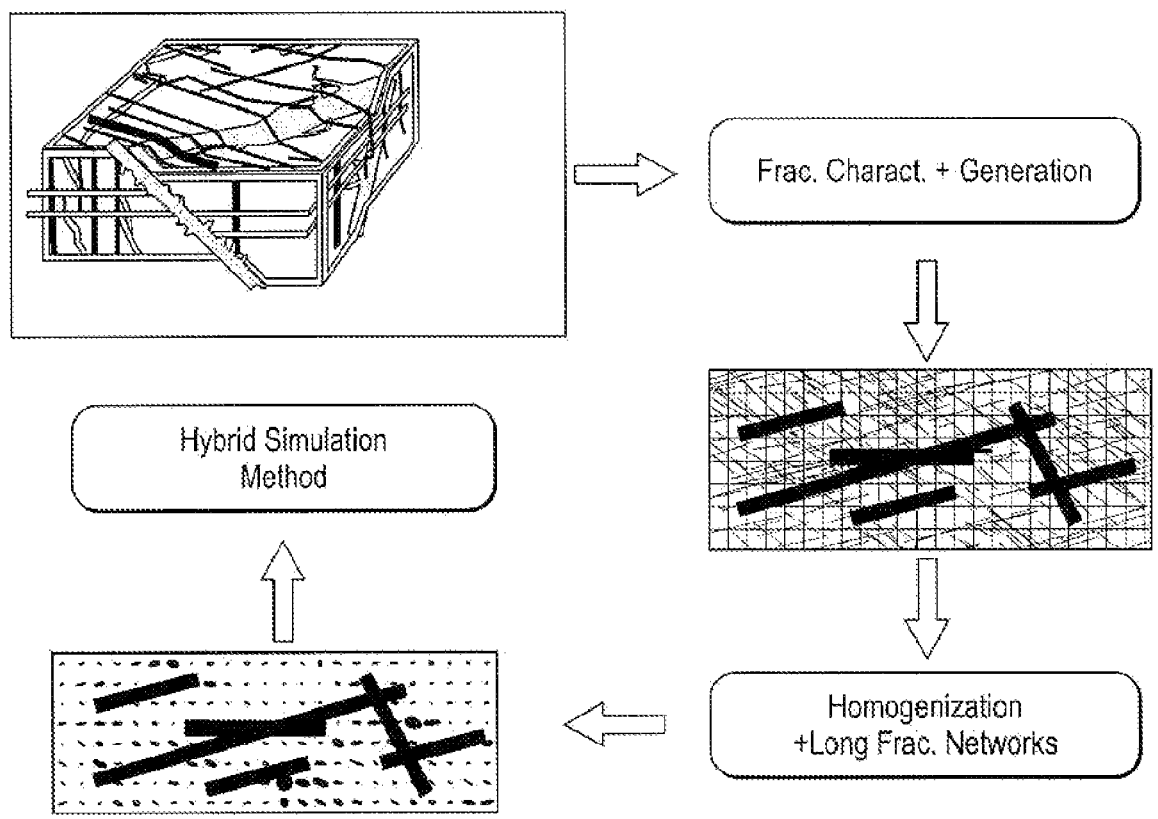
FIG. 2 is a schematic flowchart of a simulation framework for use in modeling fractured reservoirs.

The present exemplary embodiment of this invention utilizes a simulation framework, as shown in FIG. 2. Fractures are first generated through a stochastic process, followed by an identification process of fractures of different length scales, based on the ratio of fracture length and grid size of the matrix blocks. A homogenization process, to incorporate the effect of having short and medium length fractures, is ideally used to calculate equivalent or effective permeability for each matrix block. The identified long or connected fractures, which have dominant effects on flow simulation, are preferably modeled explicitly along with the homogenized media of the matrix blocks.

The homogenization process significantly reduces the total number of fractures to be modeled explicitly, while still capturing the major features of small and medium fractures. This significantly enhances computational efficiency. The explicit treatment of multi-phase flow in a network of limited number of long fractures provides a means to accurately model dominant flow behavior in a naturally fractured reservoir. Thus the present invention provides a numerically efficient and accurate hybrid method.

The network of long fractures is ideally discretized into simplified planar shapes of fracture blocks. The network of long fractures may have a strong preferred orientation due to the local stress field history for the naturally fractured reservoir. The fracture aperture is usually much smaller than the fracture length or diameter, but is still typically several orders of magnitude greater than the pore size of the reservoir in a particular grid block. To generate fractures by a stochastic process, information is needed on the statistical variation of quantities such as the fracture aperture, fracture length, fracture orientation and so on. The fracture blocks are idealized as planar voids inside the porous matrix. The fluid flow in each planar void can be modeled as being equivalent to the flow between a pair of parallel plates. This idealization implies that flow in a fracture can be modeled by two-dimensional Darcy's law.

IV. Homogenization of Short and Medium Fractures

The boundary element method, described in Lough, M. F. and S. H. Lee and J. Kamath, *A new method to calculate effective permeability of grid blocks used in the simulation of naturally fractured reservoirs*, Soc. Pet. Eng. Res. Eng., 219-224, 1997 and in Lough, M. F. and S. H. Lee and J. Kamath, *An efficient boundary integral formulation for flow through fractured porous media*, J. Comp. Physics, 143, 462-483, 1998, computes an effective conductivity for each of the matrix blocks, based on all the fractures, or fracture segments, that are wholly contained therein. Generally, fracture lengths exhibit large variations in scale, but the boundary element method ignores this fact. Fractures that are very short will affect the flow in a matrix block to a much smaller degree than fractures with lengths on the order of the grid block scale. However, both fractures are treated as being equally important by the boundary element method. This is inefficient. Also, a long fracture which cuts through several grid blocks is effectively treated as a collection of inconnected fracture segments in the effective permeability calculation. This results in underestimated values for the computed effective permeabilities.

Lee et al. derived an analytical solution to calculate the permeability contribution from short fractures by including a planar source—sink distribution on the fracture surface. See Appendix A at the end of this specification for more details of this derivation. This analytical solution technique is preferably used with this exemplary embodiment.

The contribution to the effective permeability from short fractures can be written as $$k_{short} = \sum_{i=1}^{N_{short}} \frac{w_1^{(i)} w_2^{(i)} (b^{(i)})^3}{12V} [\lambda(w_1^{(i)}, w_2^{(i)}) t_1^{(i)} \otimes t_1^{(i)} + \lambda(w_2^{(i)}, w_1^{(i)}) t_2^{(i)} \otimes t_2^{(i)}] \quad (7)$$

where $t_1^{(i)}$ and $t_2^{(i)}$ are unit tangent vectors that define the fracture and $w_1^{(i)}$ and $w_2^{(i)}$ are the respective fracture dimensions in the directions of these tangent vectors. V is the grid block volume and the operator $\otimes$ is defined as $(t \otimes t)_{ij} = \{t_i t_j\}$. The scalar items given by $\lambda$ account for the coupling of the matrix and fracture flows, which are given explicitly in the Appendix A of Lee et al.

The calculation of the effective permeability for medium length fractures in each grid block is preferably solved by the boundary element method. An advantage of using the boundary element method is the reduction in dimensionality of the problem, i.e., the original 3-dimensional problem is expressed in terms of 2-dimensional surface integrals. Since the boundary and fracture planes are typically rectangular surfaces, discretization of the surfaces into rectangular elements is trivial. In addition, the discretization results in geometrical symmetries leading to instances where the same integrals appear in different equations.

When the effective matrix permeability ($k_{meff} = k_{short} + k_{ml}$) from short fractures is anisotropic ($k_1 \neq k_2$) or a full tensor (nonzero $k_{12}$), a transformation method can be used to make the effective permeability isotropic. Lee et al. derived a general Green's function for Darcy's equation with tensor permeability for use in the boundary element method.

To account for matrix conductivity that is a full tensor requires deriving the boundary integral equations, which will involve deriving an appropriate Green's function. Darcy's equation for potential $\phi$, for a porous material with tensor conductivity k and including a source distribution f per unit volume is written as $$\nabla \cdot (k \nabla \phi) = f(x) \quad (8)$$

for any point x in the volume, V, occupied by the porous material. The boundary integral equation can be readily derived for the case of full tensor conductivity. Assuming that $G(x|x_0)$ is the Green's function that satisfies $$\nabla \cdot (k \nabla G(x|x_0)) = \delta(x - x_0) \quad (9)$$

The details are described in Appendix B of Lee et al, which is also attached as Appendix B below. The boundary integral equation is given by $$\frac{c(x)\phi(x)}{4\pi} = \int_V \nabla G(x|y) f(y) dV(y) - \int_{\partial V} G(x|y)(n \cdot (k \cdot \nabla \phi(y))) dA(y) + \int_{\partial V} \phi(y)(n \cdot (k \cdot \nabla G(x|y))) dA(y) \quad (10)$$

where k is assumed to be independent of x, i.e., it is homogeneous. c(x) is the solid angle subtended at x by the boundary. Assuming that k is symmetric and positive definite, Green's function can be solved numerically by a boundary element method.

The calculated effective or "enhanced" permeability can be used as the matrix permeability tensor input to any regular, commercial simulator or to a special hybrid simulator with the capability of explicit treatment of long fractures.

VI. Network of Long Fractures

Relative to the methods described in Lee et al., the present embodiment overcomes limitations by adopting their transport index concept and extends their work (1) to include networks of long fractures; (2) to model fractures as a two dimensional plane that can penetrate several geological layers; and (3) to allow fractures to intersect with a well bore. This generalization allows the modeling of more realistic and complex fracture networks such as those found in naturally fractured reservoirs.

Networks of two-dimensional long fractures are modeled explicitly. As the aperture size of fractures is much smaller than the fracture length, the fractures are modeled as a 2-dimensional plane. Each fracture is preferably discretized by the intersections of the long fractures and boundaries of the matrix blocks of the reservoir model. Fracture orientation, permeability, height, length and apertures are directly incorporated into the geometric properties of fracture blocks.

As fractures are approximated as a 2-dimensional plane, the grid for fracture networks is constructed from the intersection lines between long fractures and reservoir grid boundaries. The fracture grid is superposed on the regular reservoir grid. This superposed grid system method provides flexibility and simplicity in constructing grids for a naturally fractured reservoir.

The matrix flow is assumed to be linear around a fracture and, thus, a fracture connection index is developed, similar to a well production index, to establish flow and mass exchange between a fracture grid block and its host matrix block.

The fracture connection index to a well is developed for a well that intersects with long fractures. Flow between fracture and well, matrix blocks and well, fracture and matrix blocks in the well block is preferably coupled and solved simultaneously.

A line source or sink term, instead of a regular grid block, is preferably used to represent the intersections of fractures. This approximation eliminates small cells at the fracture intersection so that the numerical stability in a simulation is improved.

Flow equations of both fracture and matrix blocks are ideally developed using the finite difference method and solved simultaneously at Jacobi iteration level. Examples of this new simulation method are demonstrated below by a black oil simulator for a naturally fractured reservoir.

As discussed above, the networks of long fractures are ideally diseretized vertically and horizontally by the boundaries of the matrix grid blocks. Flow in the fracture blocks is governed by Darcy's equation, the same as flow in the matrix medium. Thus, equations (1)-(6) apply for flow in both fracture and matrix. Note that equations (1)-(3) for fracture flow becomes 2-dimensional flow (vertical and horizontal) flow in the planar fracture blocks.

Moreover, the general source/sink term in equations (1)-(3) can be expanded as $$q_l = q_l^{wm} + q_l^{wf} + q_l^{mf} \quad (11)$$

where $q_l^{wm}$ denotes the flow rate of phase l between a well and a matrix block, which is identical to the one used in a conventional black oil simulator. As a result, the well known Peaceman's formulation can be still employed for the production through the well bore as a first approximation, although the pressure field may be modified due to the presence of the intersecting fractures. $q_l^{wf}$ is the flow rate of phase l between well and fracture in the fracture systems, which is a new term used in this exemplary hybrid black oil simulator. $q_l^{mf}$, the flow rate exchange between matrix and fracture, couples the dual continuum media of matrix and fracture systems. More details regarding these latter two terms will be provided below.

Transport Index between Matrix and Fracture Blocks

In order to effectively compute the transport between the fracture and matrix blocks, an estimate is needed of the transport index that correlates the flux rate and the potential difference between the fracture and matrix blocks. The effective transport concept has been widely applied for well modeling in reservoir simulation. This concept is novel in a sense that the subgrid cell phenomenon, a strong pressure gradient around a well, is captured by the well production index.

Lee et al. employed a similar approach to the transport for a one-dimensional long fracture and corresponding grid of matrix blocks. They found that the transport index is very large so that the mass transport is mainly controlled by the pressure drop in the matrix rather than the transport index. The pressure gradient around fractures is much smaller than that around a well. As a result, it is assumed that the pressure around a fracture is linearly distributed. With this approximation, the Transport Index is calculated for the grid block that contains part of a long fracture or fracture network. Of course, other distributions of pressure around a fracture could also be used.

Figure 3:
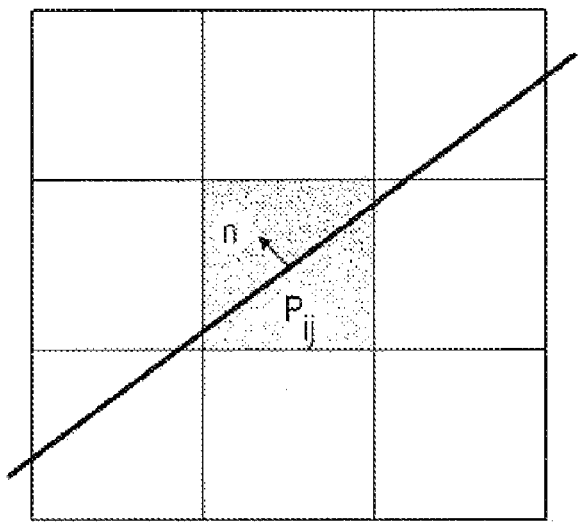
FIG. 3 is a schematic drawing of an exemplary 3×3 grid of matrix blocks which contains a portion of a long fracture from a network of long fractures.

A simple case of fracture block is depicted in FIG. 3. The fracture is assumed to fully penetrate all the block thickness in the vertical direction and the matrix block pressure is an average pressure of the block. The average normal distance from the fracture to the center of the matrix block is thus computed as:

$$\langle d \rangle = \frac{\int n \cdot x dS}{S} \quad (12)$$

Here, dS and S are the areal element and area of a grid block, respectively.

Thus, the l-phase flux from matrix block to the fracture block can be expressed as $$q_i^{mf} = k \cdot (b_i \lambda_i \Delta p) \cdot n \quad (13)$$

where $$\Delta p = \frac{(p_i^m - p_i^f)n}{\langle d \rangle} \quad (14)$$

The transport index becomes $$TI = A \frac{k \cdot n \cdot n}{\langle d \rangle} \quad (15)$$

where A is the fracture surface area in the matrix block.

If a fracture is not fully penetrated the grid block, the fracture is extended to ensure it penetrates through the grid block and computed TI as in eqn. (15). It is then assumed that TI for a partially penetrating fracture is preferably linearly proportional to the fracture length inside the grid block. Accordingly, the present hybrid model accommodates fracture blocks which are not the full height of a matrix block. This allows the exact height of a fracture to be modeled throughout one or more layers of matrix blocks.

Wells Intersecting Long Fractures

Figure 4:
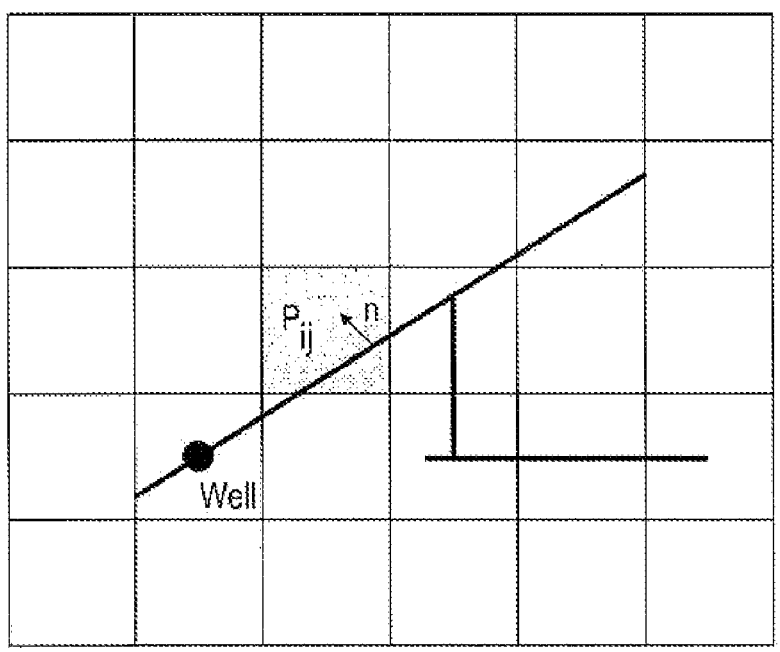
FIG. 4 is a schematic drawing of a well intersecting with a network of long fractures.

In a naturally fractured reservoir, the productivity of a well largely depends upon whether the well intersects with an extensive network of fractures. Although the extent of fracture network cannot be easily verified, a significant increase in well productivity unequivocally indicates that the well is in connection with a network of fractures. A well intersecting a fracture network is schematically shown in FIG. 4. A reservoir model, as a result, entails to model well-fracture intersections accurately and efficiently because these intersections have the most significant influence on well productivity.

A similar approach is adapted as in the long fracture model of the previous section with a specified pressure condition at the well location. A fixed bottom hole pressure, specified at the well location in the fracture network, controls flow direction such that all the fluid inside the fracture will move to the well location and be produced (or injected), whereas the long fractures without an intersecting well acts as a fluid conduit. In general, as the pressure drop inside the fracture is much smaller than the pressure drop between the matrix block and the fracture, it can also be approximated that the fractures intersecting a well can be considered as part of the well geometry. If necessary for numerical stability, as a first approximation, it can be assumed that the constant well-bore pressure can be applied through the fractures connected to or intersecting with a well.

Figure 5:
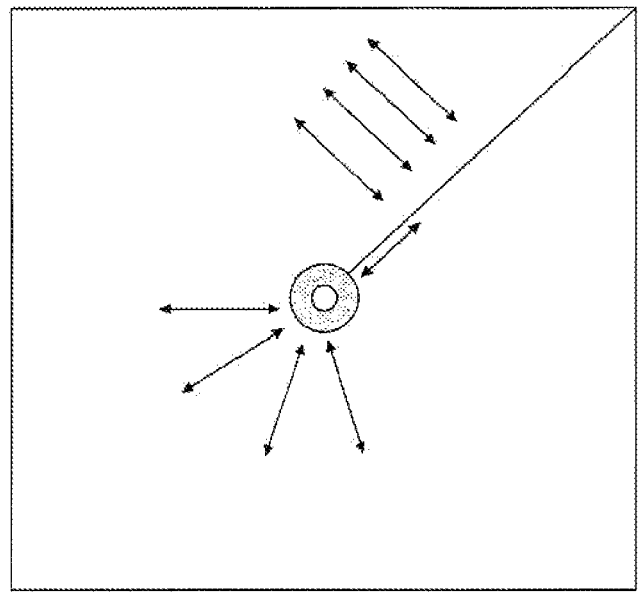
FIG. 5 is a schematic drawing showing mass transfers associated with a well having an intersecting fracture.

The mass transfer in a well block is schematically depicted in FIG. 5, where the fluid moves through the fracture portion disposed within the matrix block and also through the well bore as indicated in FIG. 5. In general, as the fracture surface of the fracture within the corresponding matrix block is much larger than the well bore surface, the production from the fracture surface will be much larger than that from the well bore surface. The fracture transmissibility in the block can be written as:

$$\Lambda' = \frac{A^f k_f}{d_w^f} \quad (16)$$

where $\Lambda^f$ is the fracture transmissibility to the well bore; $A^f$ is the fracture cross sectional area (fracture aperture times the height of fracture grid block); $k_f$ is the fracture permeability; $d_w^f$ is the distance between the center of fracture grid block to the well bore. The material balance equation can be written with production indices as follows:

$$Q_w^t = \Lambda'(b_l \lambda_l)'(\phi^l - \phi_w) + Pl_l(b_l \lambda_l)'(\phi' - \phi_w) \quad (17)$$

The pressure drop along the fracture inside the well block is assumed to be negligible and the productivities from the fracture and well bore are superposed. It is also assumed that the Peaceman's PI formulation can be directly employed. The pressure field around the well bore with an intersecting fracture can be substantially different from an independent well without fracture intersection, for which Peaceman's formulation was derived. First, the pressure drop between well block and well bore will be much smaller due to the contribution from the fracture surfaces inside the well block. Note that the main production, in general, will come through the fracture surface, ($\Lambda^f$>>PIi).

More realistic modeling of flow in a fractured reservoir is thus made possible because the described exemplary fractured reservoir model accommodates (1) conventional well-matrix block fluid flow (Peacemen's formulation), (2) direct flow along a long fracture in two-dimensions using fracture block to fracture block connections; (3) flow between a fracture block and the matrix block in which it is contained using the transport index; and (4) direct fluid flow between a fracture block and an intersecting well. Further, the present hybrid reservoir model ideally allows fluid flow between intersecting fractures utilizing a source or sinks term to enhance the stability of the solving of the flow equations. This obviates the need for a very small block to model the fluid flow of intersecting fractures which can lead to numerical instability.

VI. Apparatus and Systems

The present invention also includes an apparatus or program storage device readable by a machine, tangibly embodying a program of instructions executable by the machine to perform method steps for simulating fluid flow in a fractured subterranean reservoir. The method comprises the steps of:
(a) creating a three-dimensional hybrid reservoir model representative of a fractured subterranean reservoir, the hybrid reservoir model including porous matrix blocks and a network of long fractures overlying the matrix blocks, the network of long fractures including two-dimensional fracture blocks;
(b) obtaining matrix and fracture flow equations for fluid flow in the matrix and fracture blocks;
(c) determining the effective fluid flow transmissibility between the matrix blocks and the fracture blocks;
(d) coupling the matrix and fracture flow equations via the effective fluid flow transmissibility; and
(e) solving simultaneously the matrix and fracture flow equations for flow responses.

Furthermore, the invention may include a simulation apparatus for simulating fluid flow in a fractured subterranean reservoir. The apparatus comprises:
(a) means for creating a three-dimensional hybrid reservoir model representative of a fractured subterranean reservoir, the hybrid reservoir model including porous matrix blocks and a network of long fractures overlying the matrix blocks, the network of long fractures including two-dimensional fracture blocks;
(b) means for obtaining matrix and fracture flow equations for fluid flow in the matrix and fracture blocks;
(c) means for determining the effective fluid flow transmissibility between the matrix blocks and the fracture blocks; and
(d) means for coupling the matrix and fracture flow equations via the effective fluid flow transmissibility; and
(e) solving simultaneously the matrix and fracture flow equations for flow responses.

The apparatus and system can ideally carry out the other steps associated with the aforementioned method for reservoir simulation of fractured reservoirs.

VII. Numerical Examples

In this section, a simple stochastic program was used to generate fractures with small and medium lengths, and analytical algorithm and numerical solution are applied to compute effective conductivity tensors in each grid block. Five examples are then used to investigate the flow displacement process with a network of long fractures. To account for the tensor permeabilities, a control volume finite difference formulation, as described in Lee, S. H., L. J. Durlosky, M. F. Lough, and W. H. Chen, Finite difference simulation of geologically complex reservoirs with tensor permeabilities, Soc. Pet. Eng. Res. Eval. & Eng., 567-574, 1998 and Lee, S. H., H. Tehelepi, P. Jenny, and L. J. DeChant, Implementation of a Flux-Continuous Finite Difference Method for Stratigraphic, Hexahedron Grids, SPEJ, September 2002, 7, 267-277 has been implemented in the flow simulator.

Example 1

Single Long Fracture Model

Figure 6:
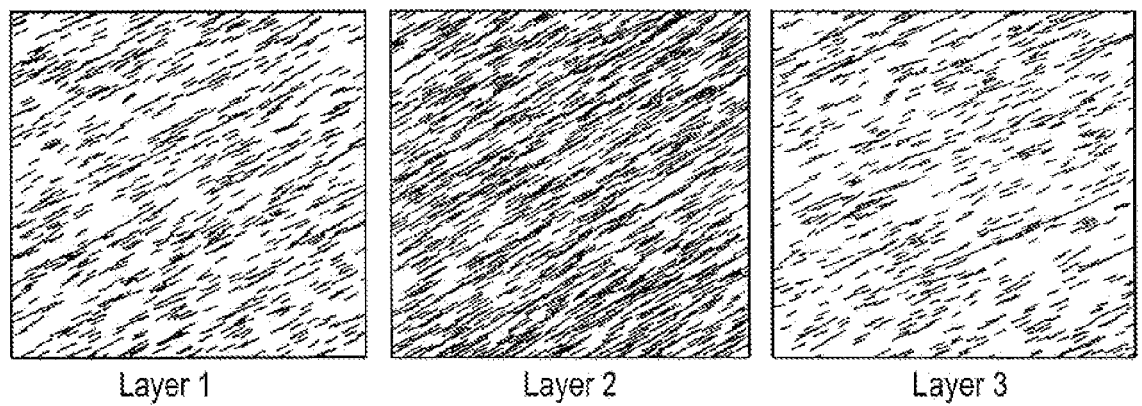
FIG. 6 is a drawing showing fracture distributions in each layer of a three layer model.

In a first example, a quarter of five-spot configuration is examined, in which the flow is driven by a source and a sink placed at the opposite corners of a three-dimensional domain. The model has dimensions of 500 ft×500 ft×9.9 ft, discretized equally by 20×20 grid blocks horizontally and 3 blocks vertically. This results in 1200 regular grid blocks with each block of dimension 25 ft×25 ft×3.3 ft. The short and medium fractures are generated from a stochastic process and are shown in FIG. 6 for Layers 1, 2, and 3. The areal or top view of the second layer of the model is shown in FIG. 7.

Figure 7:
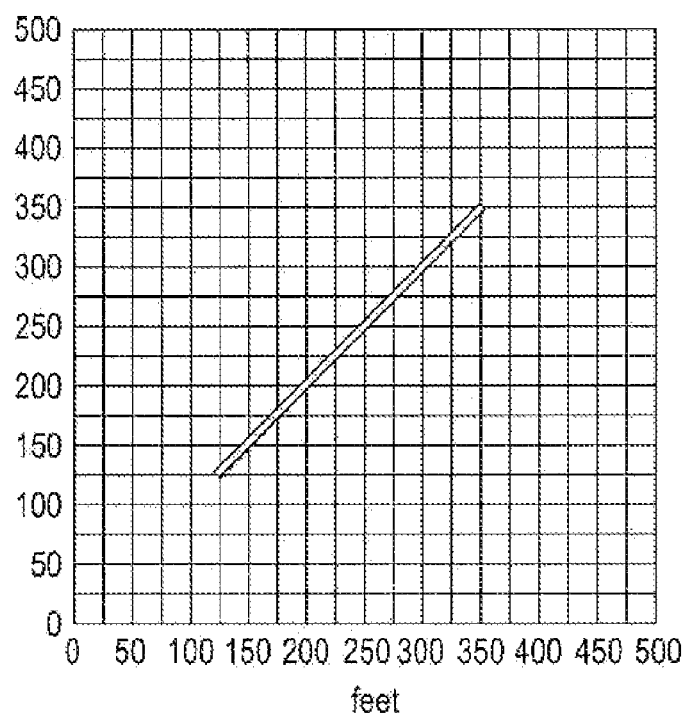
FIG. 7 is a schematic drawing of a second layer of matrix blocks wherein the solid line represents a single long fracture.

In FIG. 7, a long fracture is included which extends from cell (6, 6) to cell (15, 15), in the second layer to demonstrate how to model a long fracture as a major fluid conduit. The matrix permeability is $k_m=1$ md and the fracture permeability is $k_f=1000$ Darcy and the transport index is $TI_i=4270$ ft$^3$/day ft.

Following the hierarchical framework, the effective permeability tensor (a 3×3 matrix) is first computed for each matrix block, which becomes the input matrix permeability in this study of displacement process in the reservoir with a long fracture. As the effective permeability tensor is symmetric, three principal directions and three principal values can readily be calculated, i.e., the three principal permeabilities. Because the fracture systems are vertical, one of the principal permeabilities is naturally oriented in the vertical direction. The resulting effective permeabilities vary in each matrix block due to the randomly generated fracture distribution. The permeabilities approximately fall in this range: (1.71~52.8139) md among $k_x^{eff}$, $k_y^{eff}$, and $k_z^{eff}$ whereas (−1.1687~30.1.870) md for $k_{xy}^{eff}$. Note that the sign of $k_{xy}^{eff}$ indicates the orientation of the principal directional permeabilities.

Figure 8:
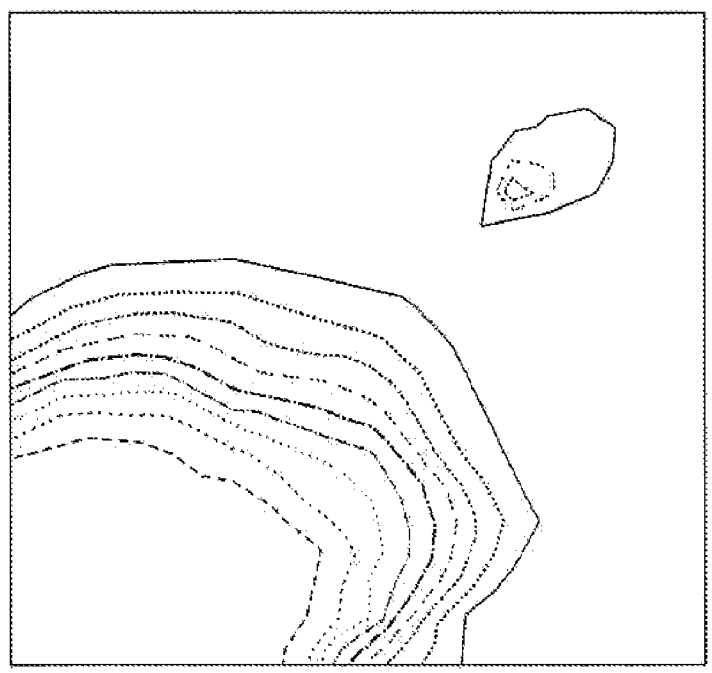
FIG. 8 shows a water saturation map of the second layer with a heterogeneous matrix medium.
Figure 9:
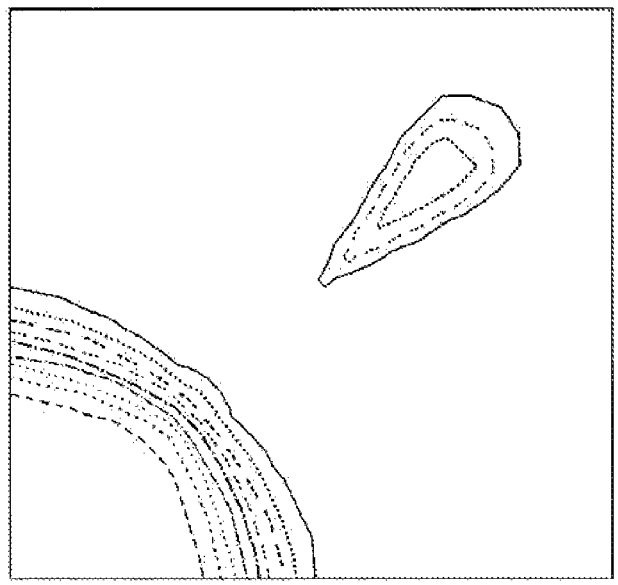
FIG. 9 shows a water saturation map of the second layer with a homogeneous matrix medium.

FIGS. 8 and 9 depict water saturation maps in the second layer in heterogeneous and homogeneous media at t=0.254 PVI (pore volume injected), respectively. The heterogeneous medium is the one where effective permeability tensor due to small/medium fractures was applied while the homogeneous is the ease without small and medium fractures (km=1 md). The diagonally placed long fracture in the second layer is applied in both cases.

Clearly, in both FIGS. 8 and 9 the effectiveness of a long fracture as a fluid conduit can fee seen. The long fracture can carry fluid very effectively from one end to the other end of the fracture because the potential difference between the fracture and the surrounding matrix blocks becomes small around the middle region. The differences in water saturation distribution of FIGS. 8 and 9 are caused by the contribution of small and medium fractures to effective grid-block permeability. Clearly, the presence of small/medium fractures enhances transport process and creates local heterogeneity in permeability.

Example 2

A Network with Three Connected Long Fractures

Figure 10:
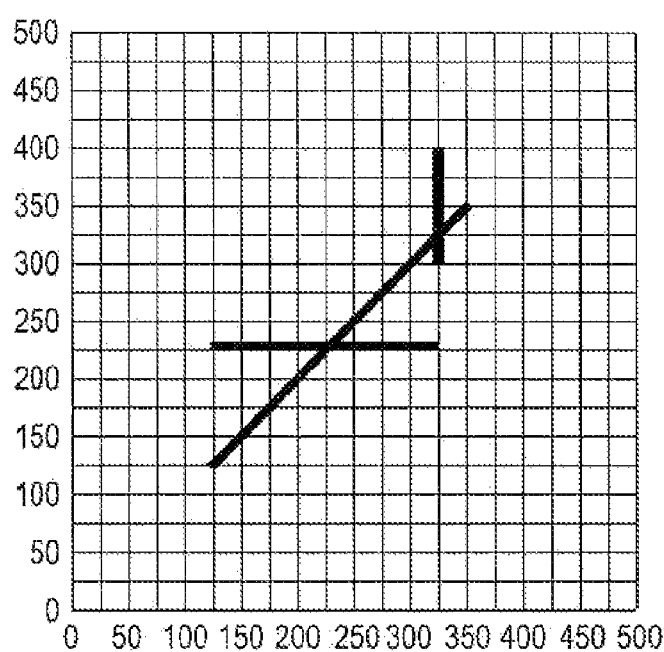
FIG. 10 is a schematic drawing showing the discretization of the second layer where solid heavy lines represent long fractures.

Based on the settings in the previous example, two other long fractures are added, from cell (6, 10) to cell (15, 10), and from cell (14, 14) to cell (14, 18), to connect the original long fracture and form a small fracture network, shown in FIG. 10. The fracture permeabilities in these newly added long fractures are the same as the previous one, as are the transport indices.

Figure 11:
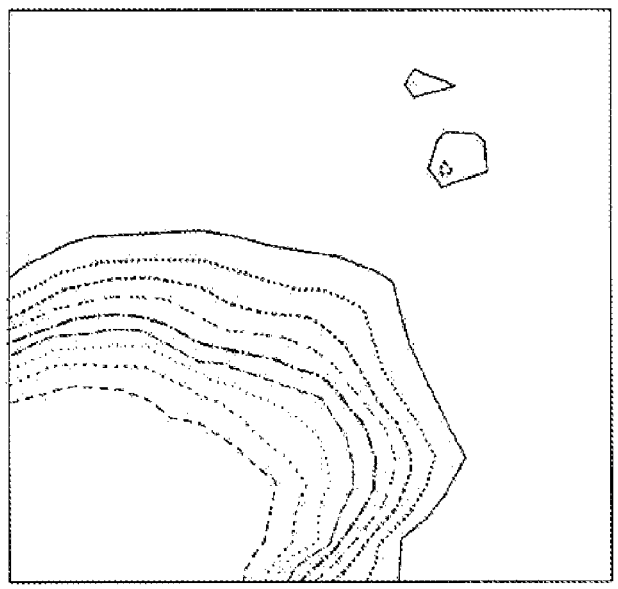
FIG. 11 illustrates a water saturation map of the second layer with a heterogeneous matrix medium.
Figure 12:
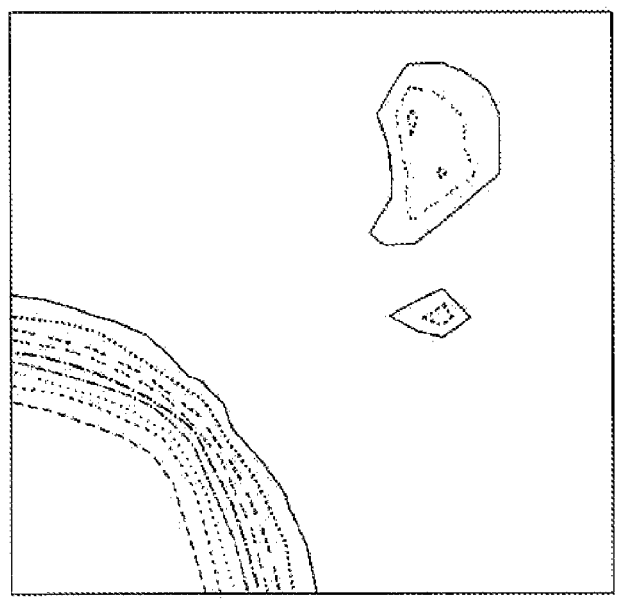
FIG. 12 shows a water saturation map of the second layer with a homogeneous matrix medium.

FIGS. 11 and 12 are water saturation maps of the second layer in the heterogeneous and homogeneous systems with a network of long fractures at t=0.254 PVI. These maps confirm that the present method of numerical simulation captures the phenomena described in the previous example. As expected, the fracture network picks up the displacing fluid from upstream ends and transport from the connected fractures to form multiple fronts in the downstream. The enhanced matrix permeability due the presence of small/medium fractures increases fluid transport in matrix, as shown in FIG. 11. The injection fluid front movement in matrix in FIG. 12, without the contribution from small and medium fractures, move slower and more radially symmetrical than in the previous case. This example illustrates how two parallel systems of continuum media are coupled through the transport indices between matrix and fracture grid blocks. Furthermore, it also demonstrates the hierarchical procedure for modeling naturally fractured reservoirs with multiple length scales.

Example 3

A Network of Long Fractures Intersecting an Injection Well

Figure 13:
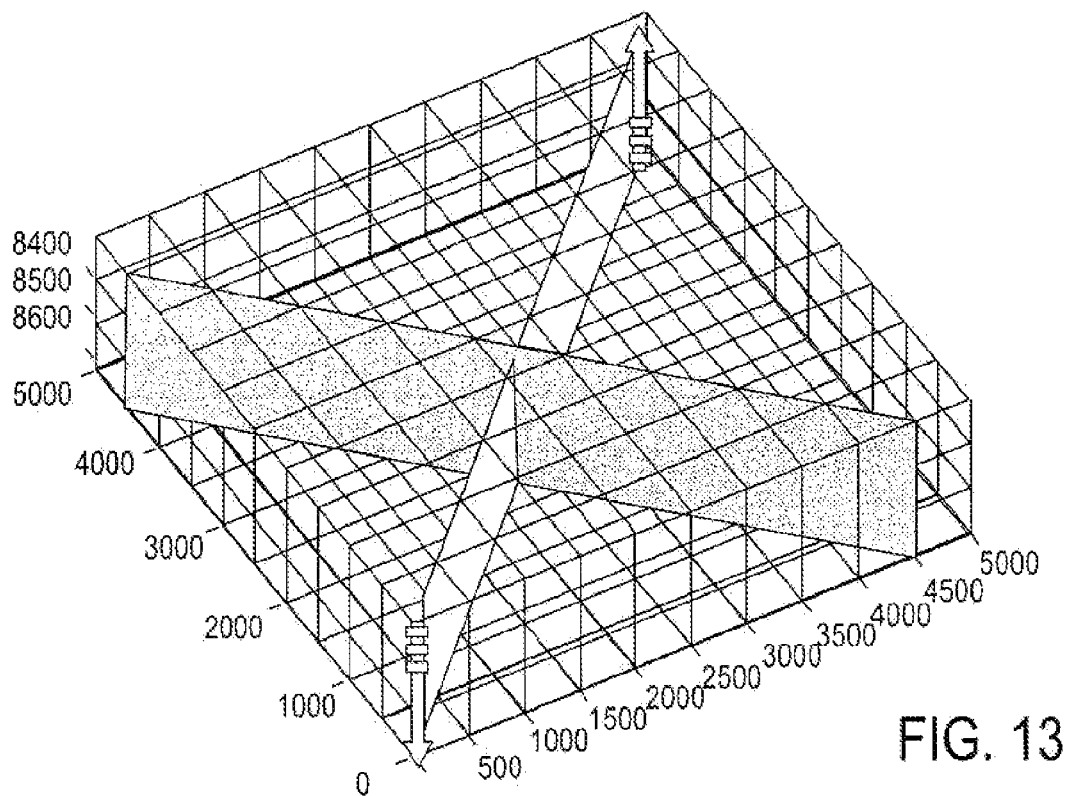
FIG. 13 is a schematic illustration of two long fractures and a discretized grid associated with a third example.

In the following three examples, a reservoir model is constructed which is 5000 ft×5000 ft×300 ft. in dimension. The top of the reservoir is 8325 feet deep and the model is discretized uniformly by 10×10 grid blocks in the horizontal plane and by 3 matrix blocks in the vertical cross-section. The initial oil saturation is assumed to be 1 in the whole domain. A quarter of a five spot pattern is applied in this bounded three-dimensional example. FIG. 13 shows the grids of the model and the locations of the injection well (1, 1, 3) and production well (10, 10, 1). Gas is injected at a constant rate, 10000 MSCF/day, and the bottom hole pressure of the producer is maintained at 4000 psi. The matrix permeabilities and porosities used in these examples are listed in Table 1.

In this example, two long, intersected fractures are included that cut through all three layers, as shown in FIG. 13. Note that all fractures are assumed to be rectangular shape. The geometry of such a fracture can be defined by the coordinates of its two diagonal corners, $(x_{f1}, y_{f1}, z_{f1})$ and $(x_{f2}, y_{f2}, z_{f2})$. The fracture permeability and aperture are $8.564 \times 10^6$ md and $3.185 \times 10^{-3}$ meters, respectively, and they are uniform along the fractures. The impact will be examined on how the intersection of the injection or production well and long fractures affect the reservoir production performance. Two cases are studied: in Example 3A, the two connected fractures of FIG. 13 do not intersect the injection well and in Example 3B, one of the fractures goes through the injection well. The injection well is located at (250 ft, 250 ft).

Figure 14:
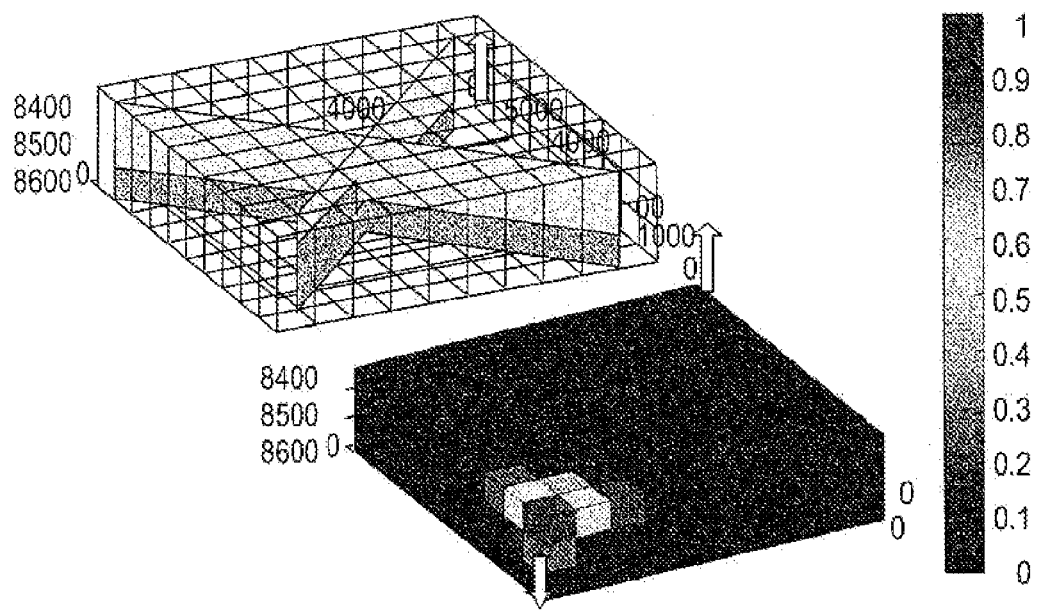
FIG. 14 shows a gas saturation distribution in fractures (upper) and matrix (lower) at 620 days, as described in an example 3A, wherein an injection well does not intersect with the fracture system.

FIG. 14 depicts the gas saturation distribution at 620 days in Example 3A. The saturation distribution in fractures is shown in the upper figure and that in matrix in the lower part of the figure. Since the fractures do not intersect the injection well, the injected gas moves into the matrix grid block first, and then enters the fracture grid block near the well bore. Once gas moves in the fracture system, it quickly propagates to the top layer of the fractures. Inspection of the bottom plot indicates that the gas in the fractures start to move into the down stream matrix blocks.

Figure 15:
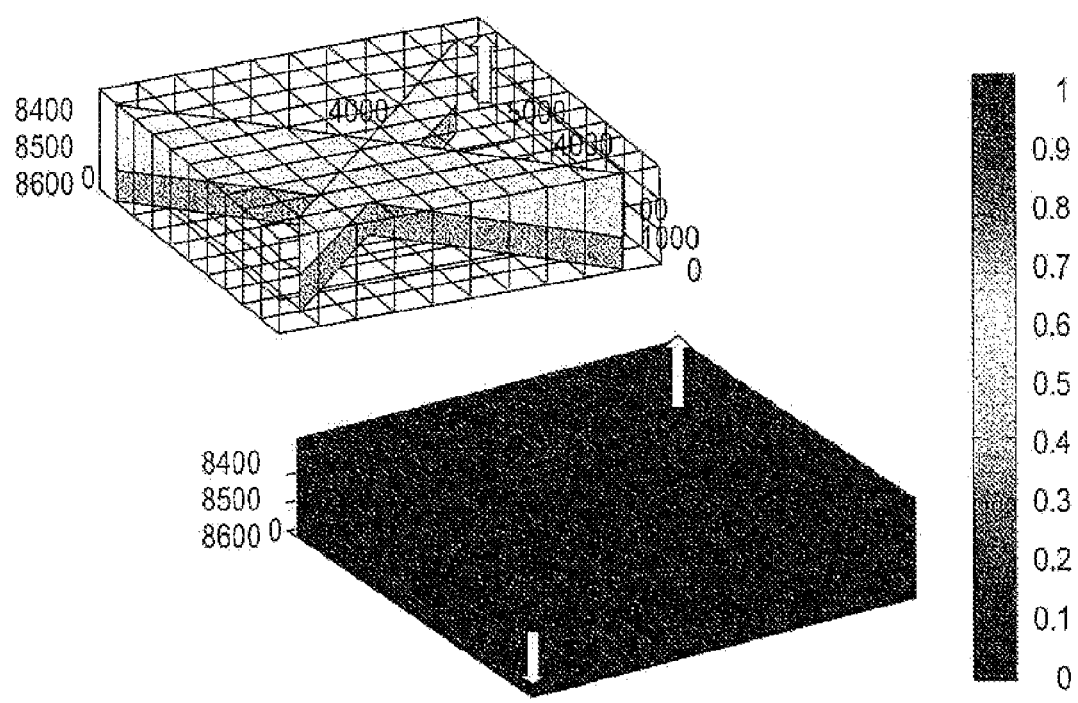
FIG. 15 shows a gas saturation distribution in fractures (upper) and matrix (lower) at 366 days, as described in an example 3B, wherein an injection well intersects with the fracture system.

In Example 3B, as one fracture intersects the injection well, the gas moves quickly through the fracture system, as indicated in FIG. 15. Note that the simulation time in the figure is an early time of 3.66 days and there is hardly any gas in the matrix around the injection well. Comparison of FIGS. 14 and 15 indicates that the fracture system intersecting an injection well experiences immediate imbibitions of the injection gas.

Figure 16:
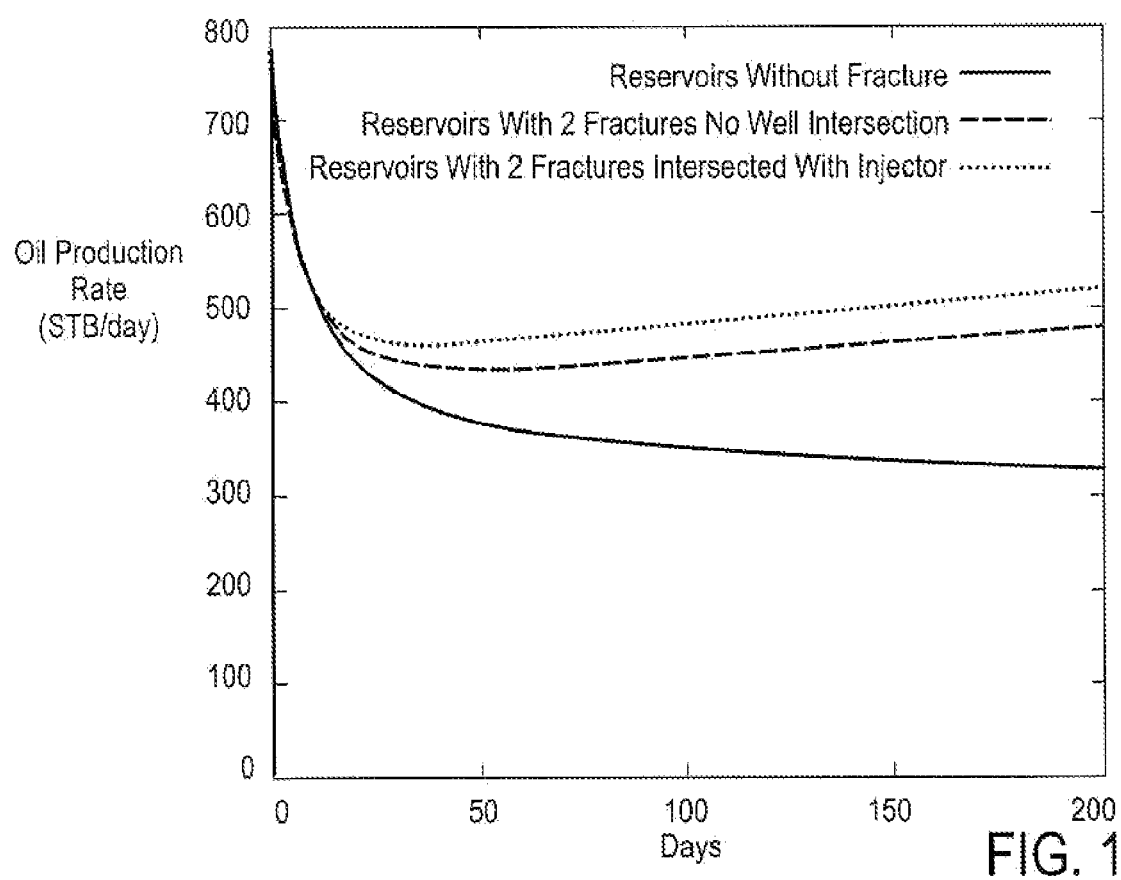
FIG. 16 is a graph illustrating a comparison of oil production rates among (1) a base example with no fractures; (2) example 3A (having the two fractures with a non-intersecting well) and (3) example 3B (having two fractures intersecting the injection wells)

In FIG. 16 the oil production rates from Examples 3A and 3B are compared with the base case of no fractures. Recall that the gas injection rate and the bottom hole pressure at the production well are constant. There is no intersection of fracture with the production well in the cases studied. A reservoir with long fractures has higher production rate than the base ease without long fractures. Furthermore, a fracture system intersecting the injection well provides more uniform pressure support in the model. Note that the production rate of Example 3B is, as a result, larger than that of Example 3A.

TABLE 1

Permeabilities and porosity in Examples 3-5.

|  | $k_x$ (md) | $k_y$ (md) | $k_z$ (md) | Porosity |
|---|---|---|---|---|
| Layer 1 | 1.267 | 1.267 | 0.0072 | 0.1626 |
| Layer 2 | 1.123 | 1.123 | 0.01013 | 0.1557 |
| Layer 3 | 1.744 | 1.744 | 0.00804 | 0.1642 |

Example 4

A Network of Long Fractures Intersecting a Production Well

Figure 17:
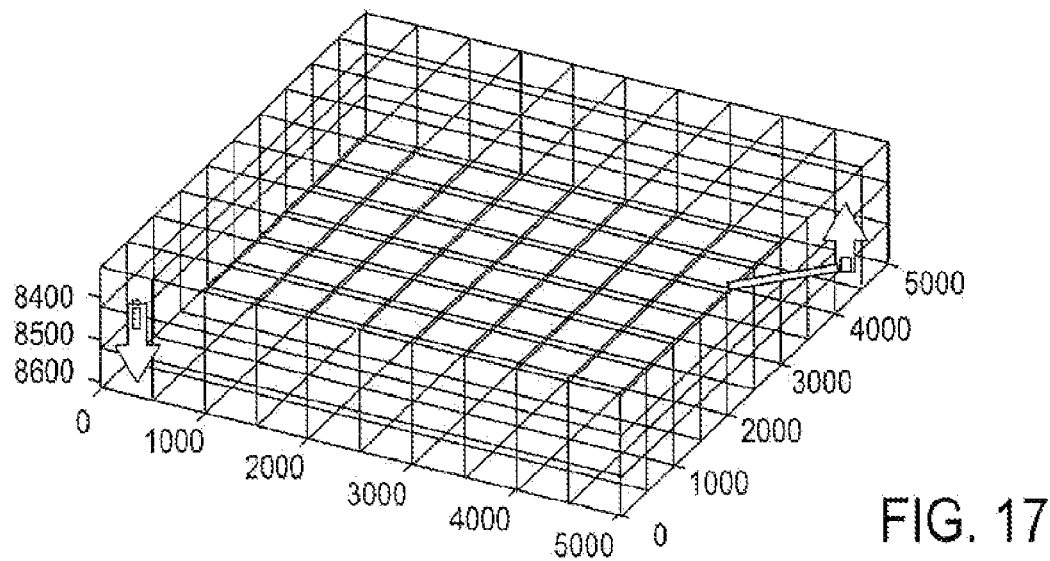
FIG. 17 is a schematic illustration of a reservoir associated with an example 4 wherein one fracture intersects with a production well.

Using the same model as in the previous example, the impact is investigated on the reservoir performance caused by the intersection of a network of long fractures and a production well. In this example there is one fracture that intersects the production well that is plotted in FIG. 17. The fracture is much smaller than the ones studied in the previous example; the length is equivalent to 1.5× grid length and the height is 0.25× grid heights. The fracture coordinates are (4000 ft, 4000 ft, 8605 ft) to (4750 ft, 4750 ft, 8625 ft).

Figure 18:
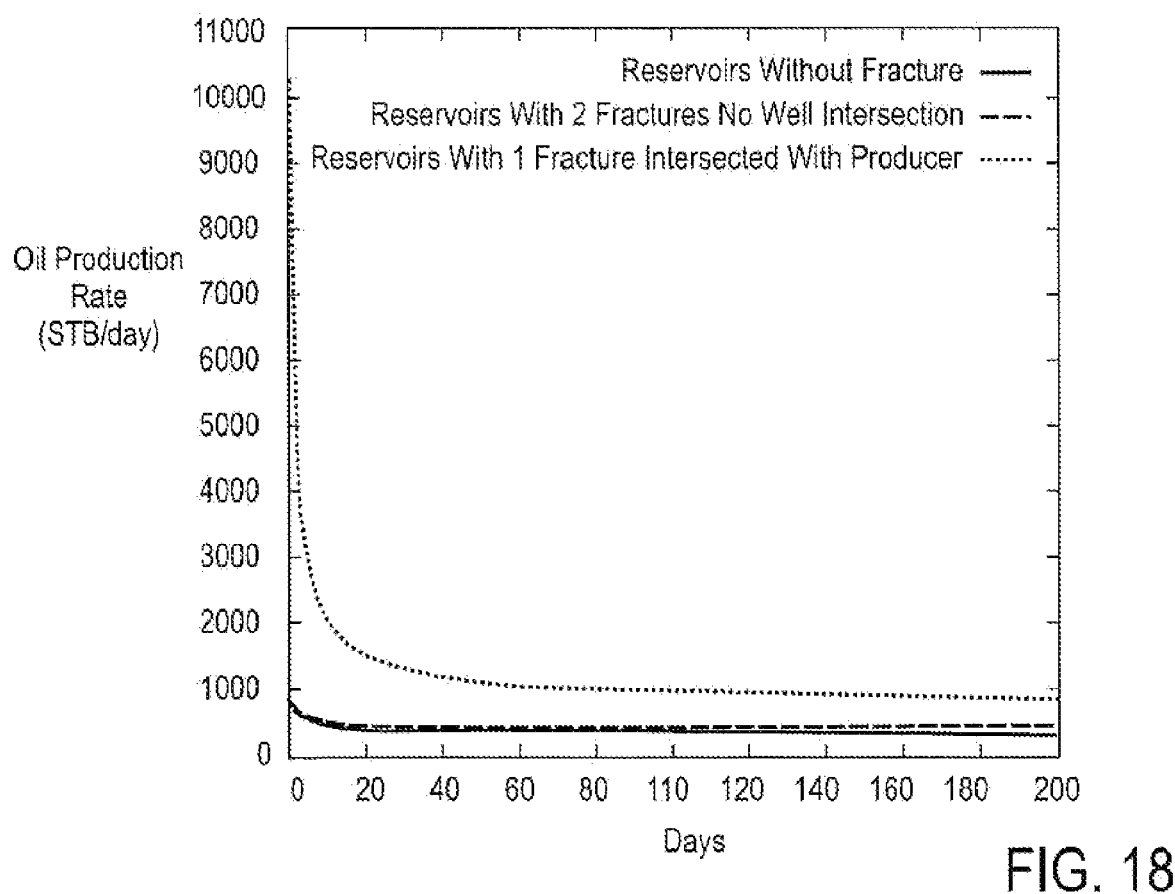
FIG. 18 is a graph comparing oil production rates for (1) a base case with no fractures; (2) Example 3A (two fractures which do not intersect a well), and Example 4 which has one fracture intersecting the production well.

In FIG. 18, the oil production rates of Example 4 are compared with those of the Base Case and Example 3A (two fractures, not intersecting the wells). It clearly shows that the intersection of fracture with the production well significantly enhances the well productivity. Although the fracture in this example is much smaller than the two fractures in the previous example, the production rate increases drastically due to the presence of an intersecting fracture with the well. The initial large production rate also drops very quickly in this example. This can be explained by the fact that the initially significant production is due to the production of the initial oil in place inside fracture, and the later production curve that is still higher than the one in the previous example is from the oil in matrix blocks via fracture blocks. This example also implies that long fractures may not be well connected in the subsurface reservoirs as observed in a surface outcrop survey because the production rate will be proportional to the overall area of all connected fractures when one of them intersects with the production well bore.

Example 5

Multiple Networks of Fractures

Figure 19:
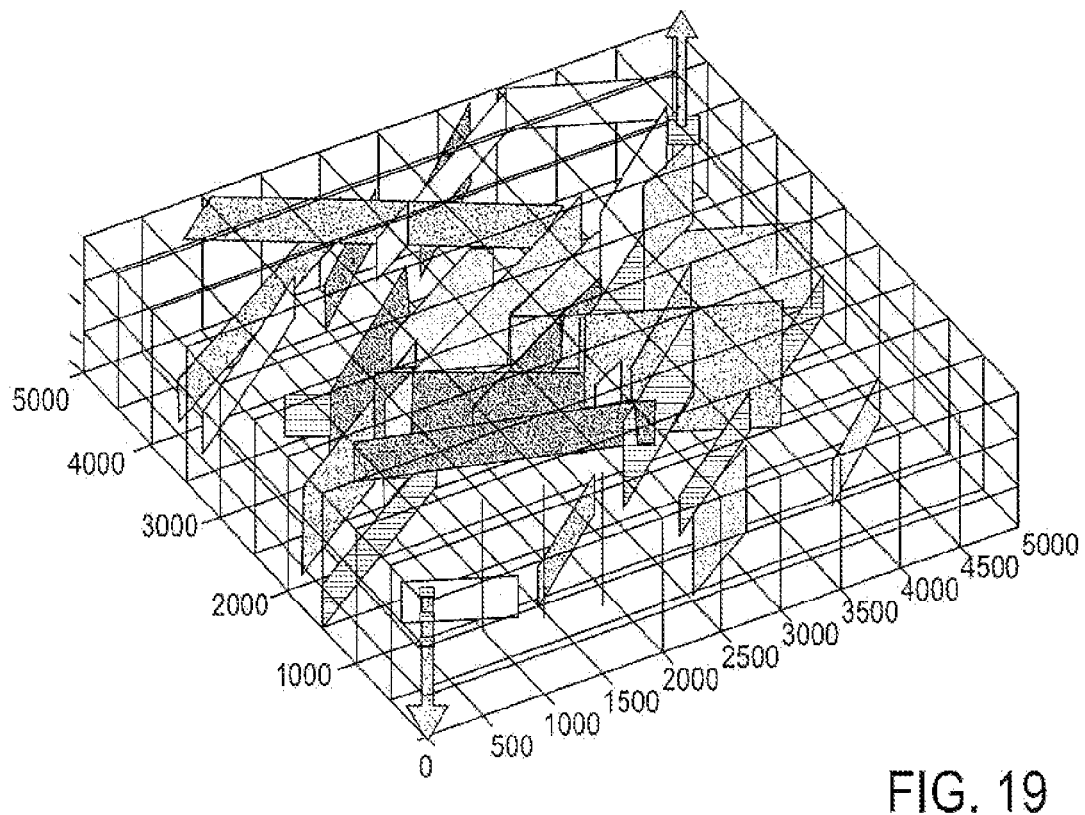
FIG. 19 shows an a distribution of 30 long fractures distributed in a reservoir model and designated as Example 5.

A series of complex fracture networks are generated utilizing 30 fractures, as shown in FIG. 19. Note that these fractures intersect neither the injector nor the producer.

Figure 20:
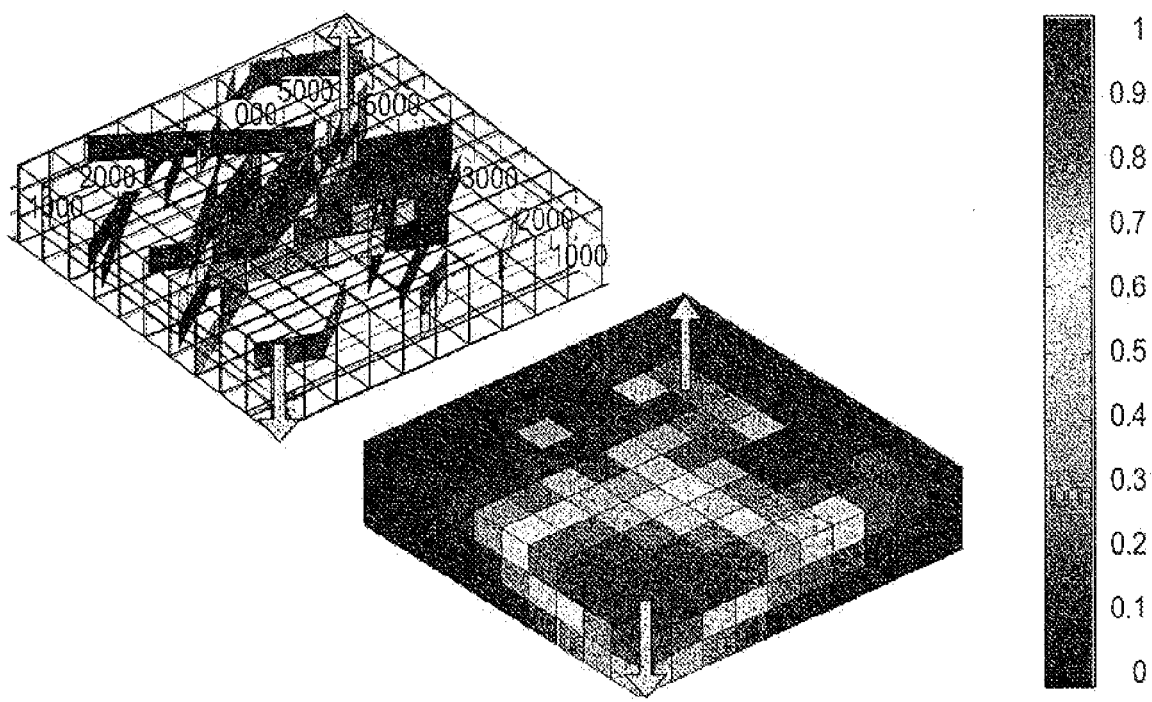
FIG. 20 is a schematic drawing of gas saturation distribution at 1600 days in fractures (tipper) and matrix (lower) from Example 5.

In FIG. 20, a gas saturation distribution is plotted at 1600 days in the fractures (upper figure) and that of matrix (lower figure). Since many fractures in this example are isolated and located away from the injection well, it took longer (1600 days) to propagate gas both in fracture network and matrix systems. As in Example 3, gas is injected into the top completion of the injection well, and then moves downstream via matrix grid blocks. Once the injection fluid (gas) encounters either a single long fracture or fracture networks, gas establishes a preferential flow path in the fracture system. This example demonstrates the capability of the simulator to handle complex networks of long fractures in a naturally fractured reservoir.

VII. Conclusions

An efficient hybrid simulation method has been described, in a preferred embodiment, for naturally fractured reservoirs that preferably includes homogenized media with short and medium fractures and networks of long fractures. A black oil simulator has been developed, based on this hybrid method.

Fractures are classified into "small", "medium", and "long"-fractures, based on the fracture length relative to the grid block size. The contributions from small and medium fractures are preferably calculated by analytical and numerical methods to yield effective matrix block permeability. This homogenization process effectively reduces the total number of fractures in fractured reservoirs, and thus greatly enhances the computational efficiency while capturing the major features of small and medium fractures. A hybrid method was devised by explicit modeling of networks of long fractures embedded in this "effective matrix-block" permeability. The explicit treatment of multiple phase flow in the limited number of long fracture systems provides an accurate flow simulation for dominant flow behavior in naturally fractured reservoirs. A well-productivity-like concept is adopted to derive the transport index between fracture block and "effective matrix block". All equations are ideally solved implicitly and simultaneously for numerical stability.

Using an exemplary black oil simulator for naturally fractured reservoirs, based on the new hybrid method, tracer transport, interaction of an injection/production well and fractures were examined. When a fracture intersects with a production well bore, a large production rate can be observed at early time and a sharp production drop follows to establish a stable rate. The stabilized production rate is still much higher than the one in a reservoir without intersection of production well and fractures, because the fractures connected with a well become part of extended well bore geometry.

Practical applications of the new hybrid method were examined with complex fracture networks of 30 long fractures. The numerical results clearly indicated that the simulator efficiently and accurately computes flow physics in long fractures, networks of fractures, and intersections between fractures and wells.

While in the foregoing specification this invention has been described in relation to certain preferred embodiments thereof, and many details have been set forth for purpose of illustration, it will be apparent to those skilled in the art that the invention is susceptible to alteration and that certain other details described herein can vary considerably without departing from the basic principles of the invention.

Nomenclature x (x, y, z)=Cartesian coordinate vector z=the reservoir depth g=gravitational acceleration $\phi$=the porosity k=absolute permeability tensor $B_l$=the formation volume factor of phase l l=o, w, g (i.e., oil, water and gas).

$p_l$=the pressure of phase l $S_l$=the saturation of phase l $k_{rl}$=the relative permeability of phase l $\mu_l$=the viscosity of phase l $\rho_l$=the density of phase l $R_s$=the solubility of gas in oil from or to matrix $A^f$=the fracture area (aperture times the fracture grid height)

$k^f$=the fracture permeability $d_w^f$=the half length of the fracture grid block length in the well grid block.

TI=the transport index between matrix and fracture $\Lambda_l^f$=the transport index between fracture grid and well bore $PI^f$=the well bore productivity index $\phi_i$=the potential of matrix grid block i $\phi_j$=the potential of fracture grid block j $\phi_w$=the potential of well bore $q_l^{wf}$=the well volumetric flow rate of phase l from or to the matrix block $q_l^{wf}$=the well volumetric flow rate of phase l from or to the fracture block $q_l^{mf}$=the volumetric flow rate of phase l from the matrix block to the fracture block $\Omega$=domain $\partial\Omega$=the boundary of domain

APPENDIX A

Short Fractures

As stated in Section 3, we propose that the short fractures be removed from the fracture set and be accounted for by an approximate analytic correction to the matrix permeability. Note that the derivation is based on a fluid with unit viscosity. Oda [1985] obtained a simple expression for effective permeability correction due to small fractures, by assuming that the fractures have no effect on the potential gradient. He proposed that the short fracture can be approximated by a line source and sink which gives the average potential gradient inside the fracture becomes the same as the ambient potential gradient in the matrix. Then the flux inside the fracture for a fluid with unit viscosity becomes $$Q^{(i)} = -\frac{(b^{(i)})^3}{12}(J_1^{(i)} + J_2^{(i)}) \tag{a1}$$

where $J_1^{(i)}$ and $J_2^{(i)}$ are respectively the components of the ambient pressure gradient in the directions of the vectors $t_1^{(i)}$ and $t_2^{(i)}$, which are in turn the unit orthogonal tangent vectors that define fracture (i). The main drawback with using this formula is that it essentially decouples the matrix and fracture flows. The effect of this is that the amount of fluid conducted through the matrix to an individual fracture remains independent of the matrix permeability. In the following derivation we also assume that very short fractures have a local effect on flow in a grid block. However, the flow in a very short fracture is strongly coupled to the flow in the matrix (since fluid flowing in the fracture must first flow through the matrix).

For the purpose of quantifying the effect of a single short fracture, we assume that its effect is to modify the potential gradient only along the fracture. The reality of the situation is that only a certain amount of fluid can be transmitted to an individual fracture through the matrix. The result of this is that the potential gradient on the fracture is reduced in magnitude from the average potential gradient in a gridblock. In particular, if the average potential gradient in a grid block is given by J, then we assume that the gradient along the fracture (i) is given by $$J^{(i)} = \lambda^{(i)}(\mathbb{I} - n^{(i)} \otimes n^{(i)})J, \tag{a2}$$

where $\mathbb{I}$ is the identity tensor, $n^{(i)}$ is the normal vector to the fracture (i), and $n \otimes n$ represents the tensor product of the vectors n and n (i.e., $(n \otimes n)_{ij} = n_i n_j$). Equation (a2) can be rewritten as $$J_1^{(i)} = \lambda_1^{(i)} t_1^{(i)} \cdot J$$

$$J_2^{(i)} = \lambda_2^{(i)} t_2^{(i)} \cdot J, \tag{a3}$$

The unit vectors $t_1^{(i)}$ and $t_2^{(i)}$ are, as described above, the principal tangent vectors for the fracture. The $\lambda$ depends on the fracture dimensions and the matrix permeability. By approximating the boundary element equations we can find a value for $\lambda$ in terms of the fracture and grid block properties.

Suppose the length of the fracture is d, its width is w and it has an aperture of b. (Typically, d~w for very short fractures. For fractures belonging to the other two classes it is reasonable to assume that the fracture width is the same as the grid block thickness.) If $l_g$ is the grid block scale, we define the dimensionless fracture parameters, $$\hat{d} = d/l_g, \ \hat{w} = w/l_g, \ \hat{b} = b/l_g. \tag{a4}$$

Before writing down the boundary element equations we note that the normal flux at the grid block boundary is $$\frac{\partial \phi}{\partial n} = n \cdot J + \psi, \tag{a5}$$

i.e., it contains a small correction, $\psi$, due to the short fractures.

By examining the flow through a grid block containing one fracture we can find the appropriate expressions for $\lambda_1^{(i)}$ and $\lambda_2^{(i)}$. The fracture can be represented as a planar source distribution, as in our original BEM model. However, we make the assumption that the planar source distribution varies linearly over the fracture, so that at a point $x^{(i)} + \xi_1 t_1^{(i)} + \xi_2 t_2^{(i)}$ the planar source strength is given by $$Q^{(i)}(\xi_1, \xi_2) = -\frac{2(b^{(i)})^3}{3}\left(\frac{\xi_1 J_1^{(i)}}{(w_1^{(i)})^2} + \frac{\xi_2 J_2^{(i)}}{(w_2^{(i)})^2}\right) \tag{a6}$$

The $w_1^{(i)}$ is the fracture dimension in the $t_1^{(i)}$ direction, $w_2^{(i)}$ the dimension in the $t_2^{(i)}$ direction and $x^{(i)}$ is the center of the fracture. In the case where we have a single fracture, we assume that the grid block is defined by the region $[-\frac{1}{2}, \frac{1}{2}] \times [-\frac{1}{2}, \frac{1}{2}] \times [-\frac{1}{2}, \frac{1}{2}]$, the fracture lies in the plane y=0 and is given by the region $[-\hat{d}/2, \hat{d}/2] \times [-\hat{w}/2, \hat{w}/2]$. Without loss of generality we assume that the average potential gradient is J=−i. The symmetry of the problem implies that the average value of $\psi$ on the grid block faces parallel to the xz and xy planes are zero. On the remaining pair of opposing faces we have $\psi(\frac{1}{2}, y, z) = -\psi(-\frac{1}{2}, y, z)$ however we ignore the dependence on (y, z) and just take the average values. The BEM equations for the potential can now be written as $$a(\phi(x, y, z) + x) = \psi \int_{-\frac{1}{2}}^{\frac{1}{2}} \int_{-\frac{1}{2}}^{\frac{1}{2}} \frac{d\eta d\zeta}{\sqrt{(x+1/2)^2 + (y-\eta)^2 + (z-\zeta)^2}} - \quad (a7)$$

$$\psi \int_{-\frac{1}{2}}^{\frac{1}{2}} \int_{-\frac{1}{2}}^{\frac{1}{2}} \frac{d\eta d\zeta}{\sqrt{(x-1/2)^2 + (y-\eta)^2 + (z-\zeta)^2}} +$$

$$\lambda \frac{2\hat{b}^3}{3k_m d^2} \int_{-\hat{d}/2}^{\hat{d}/2} \int_{-\hat{\omega}/2}^{\hat{\omega}/2} \frac{\xi d\xi d\zeta}{\sqrt{(x-\xi)^2 + y^2 + (z-\zeta)^2}} =$$

$$\psi I_2(x, y, z) + \lambda \frac{\hat{b}^3}{6k_m d^2} I_1(x, y, z, \hat{d}, \hat{\omega}).$$

Here, $\alpha$ is the solid angle subtended at x by the boundary. Evaluating (a7) at $(-\frac{1}{2}, 0, 0)$ yields a value for $\psi$ in terms of the fracture variables.

$$\psi = -\lambda \frac{\hat{b}^3}{6k_m d^2} \frac{I_1(-1/2, 0, 0, \hat{d}, \hat{\omega})}{I_2(-1/2, 0, 0)} \quad (a8)$$

Using (a7) we can rewrite (a8) as $$\alpha(\phi(x, y, z) + x) = -\lambda \frac{\hat{b}_3}{6k_m d^2} H(x, y, z, \hat{d}, \hat{\omega}), \quad (a9)$$

where $$H(x, y, z, \hat{d}, \hat{\omega}) = \frac{I_1(-1/2, 0, 0, \hat{d}, \hat{\omega})}{I_2(-1/2, 0, 0)} I_2(x, y, z) - I_1(x, y, z, \hat{d}, \hat{\omega}). \quad (a10)$$

Using our underlying assumption that $\nabla \phi - \lambda xi$ on the fracture we obtain the equation $$4\pi(-\lambda + 1) = -\lambda \frac{\hat{b}^3}{6k_m d^2} s(d, w). \quad (a11)$$

The boundary element equations imply a value of $\lambda$ given by where $$s(d, w) = \quad (a12)$$

$$\lim_{x \to 0} \left( \frac{H(x, 0, 0, d, w)}{x} \right) = -w \log \left( \frac{\sqrt{d^2 + w^2} + d}{\sqrt{d^2 + w^2} - d} \right) - \frac{w\pi}{a_0}(s_1 - s_2) +$$

$$\frac{w\pi}{a_0} \log \frac{(s_1 + 1 + d)}{(s_2 + 1 - d)} - \frac{\pi}{4a_0}(1 - d^2) \log \frac{(s_1 + w)(s_2 - w)}{(s_1 - w)(s_2 + w)}.$$

Here, $s_1 = \sqrt{(1-d)^2 + w^2}$, $s_2 = \sqrt{(1+d)^2 + w^2}$, (a13)

and $a_0 = 3 \left( 2\tan^{-1}\left(\frac{1}{2\sqrt{6}}\right) + \log\left(\frac{\sqrt{2}+1}{\sqrt{2}-1}\right) - \log\left(\frac{\sqrt{6}+1}{\sqrt{6}-1}\right) \right).$ Solving for $\lambda$ we get $\lambda(\hat{d}, \hat{w}; \hat{b}, k_m, k_f) = \frac{k_m}{\left(k_m - k_f \frac{(\hat{b})}{2\pi\hat{d}^2} s(\hat{d}, \hat{w})\right)}$, (a14)

Suppose there are $N_{short}$ very short fractures in a certain grid block. If the dimensions of the i-th fracture is given by $w_1^{(i)} \times w_2^{(i)}$ and it is spanned by the unit vectors $t_1^{(i)}$ and $t_2^{(i)}$ then the contribution to the effective permeability coming from very short fractures is given by $$k_{short} = \quad (a15)$$

$$\sum_{i=1}^{N_{short}} \frac{w_1^{(i)} w_2^{(i)} (b^{(i)})^3}{12V} (\lambda(w_1^{(i)}, w_2^{(i)}) t_1^{(i)} \otimes t_1^{(i)} + \lambda(w_2^{(i)}, w_1^{(i)}) t_2^{(i)} \otimes t_2^{(i)}),$$

where V is the gridblock volume. If the fractures are given in terms of distribution functions for the fracture parameters, then the contribution to the effective permeability coming from very short fractures is given by $$k_{short} = \begin{pmatrix} k_1 & k_{12} & 0 \\ k_{12} & k_2 & 0 \\ 0 & 0 & k_3 \end{pmatrix} \quad (a16)$$

where $$k_1 = \frac{A_{32}}{E[w_1 w_2]} E\left[\frac{b^3 w_1 w_2}{12} \lambda(w_1, w_2) \cos^2\theta\right] \quad (a17)$$

$$k_2 = \frac{A_{32}}{E[w_1 w_2]} E\left[\frac{b^3 w_1 w_2}{12} \lambda(w_1, w_2) \sin^2\theta\right]$$

$$k_3 = \frac{A_{32}}{E[w_1 w_2]} E\left[\frac{b^3 w_1 w_2}{12} \lambda(w_2, w_1)\right]$$

$$k_{12} = \frac{A_{32}}{E[w_1 w_2]} E\left[\frac{b^3 w_1 w_2}{12} \lambda(w_1, w_2) \cos\theta \sin\theta\right].$$

where $\theta$ is the strike angle for a fracture, $A_{32}$ is the areal density of fracturing and E [.] is the expected value (which depends on the distribution functions).

APPENDIX B

Boundary Integral Formulation for Tensor Matrix Permeability

To account for a matrix permeability that is a full tensor requires a rederivation of the boundary integral equations, which will involve deriving an appropriate Green's function. Darcy's equation for the pressure p, for a porous material with tensor permeability K and including a source distribution f per unit volume is written as $$\nabla \cdot (\mathbf{K} \nabla p) = f(x), \quad (b1)$$

for any point x in the volume, V, occupied by the porous material. When $\mathbf{K} = \mathbf{I}$ the identity, the Green's function, $G_0(x|x_0) = -1/(4\pi|x - x_0|)$, (also known as the fundamental solution) satisfies $$\nabla^2 G_0(x|x_0) = \delta(x - x_0), \quad (b2)$$

and using the so-called Green's identity, it follows that the solution of (b1) is given by the boundary integral equation $$\frac{c(x)p(x)}{4\pi} = \int_V G_0(x|y)f(y)dV(y) - \int_{\partial V} G_0(x|y)\frac{\partial p}{\partial n}(y)dA(y) + \int_{\partial V} p(y)\frac{\partial G_0}{\partial n}(x|y)dA(y), \quad (b3)$$

where n is the outward unit normal to the boundary, $\partial V$, and c(x) is the solid angle subtended at x by the boundary.

The boundary integral equation is readily written down for the case of a full tensor permeability. Assuming that $G(x|x_0)$ is the Green's function that satisfies $$\nabla \cdot (\mathbb{K} \nabla G(x|x_0)) = \delta(x-x_0), \quad (b4)$$

(which we will solve below), the boundary integral equation is given by $$\frac{c(x)p(x)}{4\pi} = \int_V G(x|y)f(y)dV(y) - \int_{\partial V} G(x|y)(n \cdot (\mathbb{K} \cdot \nabla p(y)))dA(y) + \int_{\partial V} p(y)(n \cdot (\mathbb{K} \cdot \nabla G(x|y)))dA(y), \quad (b5)$$

which is clearly the generalisation of (b3). We note that in deriving (b5) we assumed that $\mathbb{K}$ was independent of x, i.e., it is homogeneous. To find the Green's function we show how (b4) is related to (b2) and use the corresponding solution of (b2) to deduce the solution of (b4). Assuming that $\mathbb{K}$ is symmetric and positive definite [Lough et al., 1998], we can find a tensor $\mathbb{P}$ such that $\mathbb{P}^T \mathbb{P} = \mathbb{P}\mathbb{P}^T = \mathbb{I}$ and $$\mathbb{P}^T \mathbb{K} \mathbb{P} = \mathbb{K}_D = \begin{pmatrix} k_1 & 0 & 0 \\ 0 & k_2 & 0 \\ 0 & 0 & k_3 \end{pmatrix}, \quad (b6)$$

where $k_{1,2,3}$ are the principal values of the permeability tensor and are all positive. We also define another tensor $\mathbb{L}$ given by $$\mathbb{L} = \mathbb{P}\mathbb{K}_D^{-1/2} = \mathbb{P}\begin{pmatrix} \frac{1}{\sqrt{k_1}} & 0 & 0 \\ 0 & \frac{1}{\sqrt{k_2}} & 0 \\ 0 & 0 & \frac{1}{\sqrt{k_3}} \end{pmatrix}. \quad (b7)$$

Consider the transformation of coordinates given by $$x^* = \mathbb{L}^T x. \quad (b8)$$

In terms of the new coordinate system we rewrite (b4) as $$\nabla^* \cdot ((\mathbb{L}^T \mathbb{L} \mathbb{K}) \nabla^* G^*(x^*|x^*_0) = \gamma^* \delta(x^* - x^*_0), \quad (b9)$$

where $G^*$ is related to $G$ by $$G^*(x^*|x^*_0) = G(\mathbb{L}^{-1} x^* | \mathbb{L}^{-1} x^*_0) \quad (b10)$$

and $\gamma^*$ accounts for the change in the delta function brought about by the change in coordinate system. To find $\gamma^*$ we use the fact that for a suitable test function $\psi(x)$ (cf., any book dealing with generalized functions or operator theory) we have $$\psi(x_0) = \int_{R^3} \psi(x)\delta(x - x_0)dV(x) \quad (b11)$$

$$= \gamma^* \int_{R^3} \psi(\mathbb{L}^{-1} x^*)\delta(x^* - x^*_0)|\mathbb{L}^{-1}|dV(x^*)$$

$$= \gamma^* |\mathbb{L}^{-1}| \psi(\mathbb{L}^{-1} x^*_0)$$

$$= \gamma^* |\mathbb{L}^{-1}| \psi(x_0)$$

which implies that $\gamma^*$ is related to the determinant of $\mathbb{L}$ by $$\gamma^* = \frac{1}{|\mathbb{L}^{-1}|} = \frac{1}{\sqrt{k_1 k_2 k_3}}. \quad (b12)$$

Using $\mathbb{L}^T \mathbb{L} \mathbb{K} = \mathbb{I}$ we rewrite (b9) as $$(\nabla^*)^2 G^*(x^*|x^*_0) = \gamma^* \delta(x^* - x^*_0), \quad (b13)$$

which according to (b2) has the solution $$G^*(x^*|x^*_0) = -\frac{\gamma^*}{4\pi|x^* - x^*_0|} \quad (b14)$$

$$= -\frac{\gamma^*}{4\pi\sqrt{(x^* - x^*_0)^T(x^* - x^*_0)}}.$$

Finally, we use (b10) and (b14) to find that the Green's function solution we require is $$G(x|x_0) = -\frac{\gamma^*}{4\pi\sqrt{(x - x_0)^T \mathbb{L}\mathbb{L}^T(x - x_0)}}. \quad (b15)$$

What is claimed is:

1. A method for simulating fluid flow in a fractured subterranean reservoir, the method comprising the steps of:
   (a) creating a three-dimensional hybrid reservoir model representative of a fractured subterranean reservoir, the hybrid reservoir model including porous matrix blocks and a network of long fractures overlying the matrix blocks, the network of long fractures including interconnected long fractures, the network of long fractures including two-dimensional fracture blocks;
   (b) obtaining matrix and fracture flow equations for fluid flow in the matrix and fracture blocks;
   (c) determining the effective fluid flow transmissibility between the matrix blocks and the fracture blocks;
   (d) coupling the matrix and fracture flow equations via the effective fluid flow transmissibility;
   (e) solving simultaneously the matrix and fracture flow equations for flow responses;
   (f) using the flow responses to simulate fluid flow in the fractured subterranean reservoir; and
   (g) outputting a visual display responsive to the simulated fluid flow in the fractured subterranean reservoir.

2. The method of claim 1 wherein:
   the flow equations are finite difference equations.

3. The method of claim 1 wherein:
   the flow equations are finite volume equations.

4. The method of claim 1 wherein:
   the flow equations estimate fluid flow for a multiphase fluid.

5. The method of claim 1 wherein:
   the fracture blocks are disposed in the matrix blocks at id are at least partial defined by the intersection of the long fractures and the boundaries of the matrix blocks.

6. The method of claim 5 wherein:
at least one of the long fractures has fluid flow directly between the fracture blocks comprising the at least one long fracture.

7. The method of claim 1 wherein:
the hybrid reservoir model includes at least one well for the injection into, or production from, the fractured reservoir; and
at least one fracture block intersects with the well and fluid flows directly between the well and the at least one intersecting fracture block.

8. The method of claim 7 wherein:
the pressure in the well and in the intersecting fracture block are maintained at the same pressure wherein numerical stability in solving the flow equations is enhanced.

9. The method of claim 1 wherein:
the matrix blocks are arranged in multiple layers of matrix blocks; and
at least one of the long fractures extends across the multiple layers and has direct fluid through its fracture blocks and across the multiple layers.

10. The method of claim 1 wherein:
at least one of the fracture blocks is less than the height of the matrix block in which it is disposed.

11. The method of claim 1 wherein:
the two-dimensional fracture blocks are generally defined by two opposing plates with an aperture defined there between.

12. The method of claim 1 wherein:
the two-dimensional long fractures have lengths and heights which are representative of the fractures in the fractured reservoir being modeled to honor the physical orientation of estimated fractures an fractured reservoir being modeled.

13. The method of claim 1 wherein:
the two-dimensional long fractures are oriented with respect to the matrix blocks to honor the physical shape of estimated fractures in the fractured reservoir being modeled.

14. The method of claim 1 wherein:
the effective fluid flow transmissibility is used to fluidly couple fracture blocks to matrix blocks.

15. The method of claim 1 wherein:
a transport index is used to fluidly couple the matrix blocks to the respective fracture block in which the matrix blocks are disposed.

16. The method of claim 1 wherein:
at least two of the lone fractures intersect with one another to form an intersection; and
the intersection is modeled as a source or sink term to enhance the stability of the solving of the flow equations.

17. The method of claim 1 wherein:
the reservoir model includes means for direct matrix block to fracture block fluid communication, direct matrix block to well fluid communication and direct fracture block to well block communication.

18. A program storage device readable by a machine, tangibly embodying a program of instructions executable by the machine to perform method steps for simulating fluid how in a fractured subterranean reservoir, the method comprising the steps of:
(a) creating a three-dimensional hybrid reservoir model representative of a fractured subterranean reservoir, the hybrid reservoir model including porous matrix blocks and a network of long fractures oven vine the matrix blocks, the network of lone fractures including interconnected long fractures, the network of long fractures including two-dimensional fracture blocks:
(b) obtaining matrix and fracture flow equations for fluid flow in the matrix and fracture blocks;
(c) determining the effective fluid flow transmissibility between the matrix blocks and the fracture blocks;
(d) coupling the matrix and fracture flow equations via the effective fluid flow transmissibility;
(e) solving simultaneously the matrix and fracture flow equations for flow responses;
(f) using the flow responses to simulate fluid flow in the fractured subterranean reservoir; and
(g) outputting a visual display responsive to the simulated fluid flow in the fractured subterranean reservoir.

19. A simulation apparatus for simulating fluid flow in a fractured subterranean reservoir, the apparatus comprising:
(a) means for creating a three-dimensional hybrid reservoir model representative of a fractured subterranean reservoir, the hybrid reservoir, model including porous matrix blocks and a network of long fractures overlying the matrix blocks, the network of long fractures including interconnected long fractures, the network of lone fractures including two-dimensional fracture blocks;
(b) means for obtaining matrix and fracture flow equations for fluid flow in the matrix and fracture blocks;
(c) means for determining the effective fluid flow transmissibility between the matrix blocks and the fracture blocks;
(d) means for coupling the matrix and fracture flow equations via the effective fluid flow transmissibility;
(e) solving simultaneously the matrix and fracture flow equations for flow responses;
(f) using the flow responses to simulate fluid flow in the fractured subterranean reservoir; and
(g) outputting a visual display responsive to the simulated fluid flow in the fractured subterranean reservoir.

* * * * *